(12) United States Patent
Zhang

(10) Patent No.: US 8,867,675 B1
(45) Date of Patent: Oct. 21, 2014

(54) LOW BANDWIDTH PHY WITH FREQUENCY OFFSET CONSTRAINTS

(75) Inventor: Hongyuan Zhang, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 38 days.

(21) Appl. No.: 13/550,272

(22) Filed: Jul. 16, 2012

Related U.S. Application Data

(60) Provisional application No. 61/515,227, filed on Aug. 4, 2011.

(51) Int. Cl.
*H04L 27/06* (2006.01)

(52) U.S. Cl.
USPC .......... 375/344; 375/316; 375/343; 375/259; 375/260; 375/285; 375/346

(58) Field of Classification Search
USPC .......... 375/316, 343, 344, 259, 260, 285, 346
See application file for complete search history.

(56) References Cited

U.S. PATENT DOCUMENTS

| | | | | |
|---|---|---|---|---|
| 7,627,059 | B2 * | 12/2009 | Niu et al. | 375/324 |
| 8,503,504 | B2 * | 8/2013 | Dehmas | 375/142 |
| 8,548,033 | B2 * | 10/2013 | Nemeth et al. | 375/219 |
| 2009/0196163 | A1 | 8/2009 | Du | |
| 2010/0046358 | A1 | 2/2010 | Van Nee | |
| 2010/0309834 | A1 | 12/2010 | Fischer et al. | |
| 2011/0002219 | A1 | 1/2011 | Kim et al. | |
| 2011/0293040 | A1 * | 12/2011 | Dupont et al. | 375/316 |
| 2012/0027147 | A1 * | 2/2012 | Ray et al. | 375/359 |
| 2012/0195391 | A1 | 8/2012 | Zhang et al. | |
| 2012/0201316 | A1 | 8/2012 | Zhang et al. | |
| 2012/0324315 | A1 | 12/2012 | Zhang et al. | |

FOREIGN PATENT DOCUMENTS

WO   WO 2012/122119   9/2012

OTHER PUBLICATIONS

IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.*, Nov. 7, 2001.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

(Continued)

*Primary Examiner* — Siu Lee

(57) ABSTRACT

In a method for estimating a carrier frequency offset (CFO) between a transmitting device and a receiving device, a data unit is received. The data unit includes aperiodic sequence. An initial phase shift value of a phase shift between adjacent periods of the periodic sequence is generated, and a plurality of cross-correlations using at least one period of the periodic sequence are performed to generate a plurality of cross-correlation results. Each cross-correlation is performed using one of a plurality of possible actual phase shift values. An actual phase shift value is selected, based on the plurality of cross-correlation results, from the plurality of possible actual phase shift values. An estimate of the CFO is generated based at least in part on one of the initial phase shift value or the actual phase shift value.

18 Claims, 17 Drawing Sheets

(56) References Cited

OTHER PUBLICATIONS

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.

Park, "Proposed Specification Framework for TGah", *The Institute of Electrical and Electronics Engineers*, doc. No. IEEE 802.11-11/1137r6, (Mar. 2012).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band, "*The Institute of Electrical and Electronics Engineers, Inc.*, Apr. 2003.

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Mar. 2012.

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, Nov. 2011.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

Stacey et al., "IEEE P802.11, Wireless LANs, Proposed TGac Draft Amendment," Institute of Electrical and Electronics Engineers, doc. No. IEEE 802.11-10/1361r3 (Jan. 2011).

Stacey et al., "Specification Framework for TGac," document No. IEEE 802.11-09/0992r20, *Institute for Electrical and Electronics Engineers*, pp. 1-49, Jan. 18, 2011.

IEEE Std 802.11ac/D2.1 "Draft Standard for Information Technology—Telecommunications and information exchange between systems-Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Mar. 2012.

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jun. 2012.

Perahia, et al., "Gigabit Wireless LANs: an overview of IEEE 802.11ac and 80211ad," ACM SIGMOBILE Mobile Computing and Communications Review, vol. 15, No. 3, pp. 23-33, Jul. 2011.

Yu et al., "Coverage extetion for IEEE802.11ah," *The Institute of Electrical and Electronics Engineers*, doc. No. IEEE 802.11-11/0035r1, (Jan. 2011).

Taghavi et al., "Introductory Submission for TGah", doc. No. IEEE 802.11-11/0062r0, *Institute for Electrical and Electronics Engineers*, pp. 1-5 (Jan. 14, 2011).

de Vegt, "Potential Compromise for 802.11ah Use Case Document", Institute of Electrical and Electronics Engineers, doc. No. IEEE 802.11-11/0457r0, (Mar. 2011).

Zhang et al., "11ah Data Transmission Flow," *The Institute of Electrical and Electronics Engineers*, doc. No. IEEE 802.11-11/1484r1, (Nov. 2011).

Park, "Proposed Specification Framework for TGah D9.x", *The Institute of Electrical and Electronics Engineers*, doc. No. IEEE 802.11-yy/xxxxr0, (Jul. 2012).

Vermani, et al. "Preamble Format for 1 MHz," *The Institute of Electrical and Electronics Engineers*, doc. No. IEEE 802.11-11/1482r2, (Nov. 2011).

Zhang et al., "1MHz Waveform in Wider BW", *The Institute of Electrical and Electronics Engineers*, doc. No. IEEE 802.11-12/0309r1, (Mar. 2012).

Vermani, et al. "Spec Framework Text for PHY Numerology," *The Institute of Electrical and Electronics Engineers*, doc. No. IEEE 802.11-11/1311r0, (Sep. 2011).

Park, "Proposed Specification Framework for TGah", *The Institute of Electrical and Electronics Engineers*, doc. No. IEEE 802.11-11/1137r11, (Sep. 2012).

\* cited by examiner

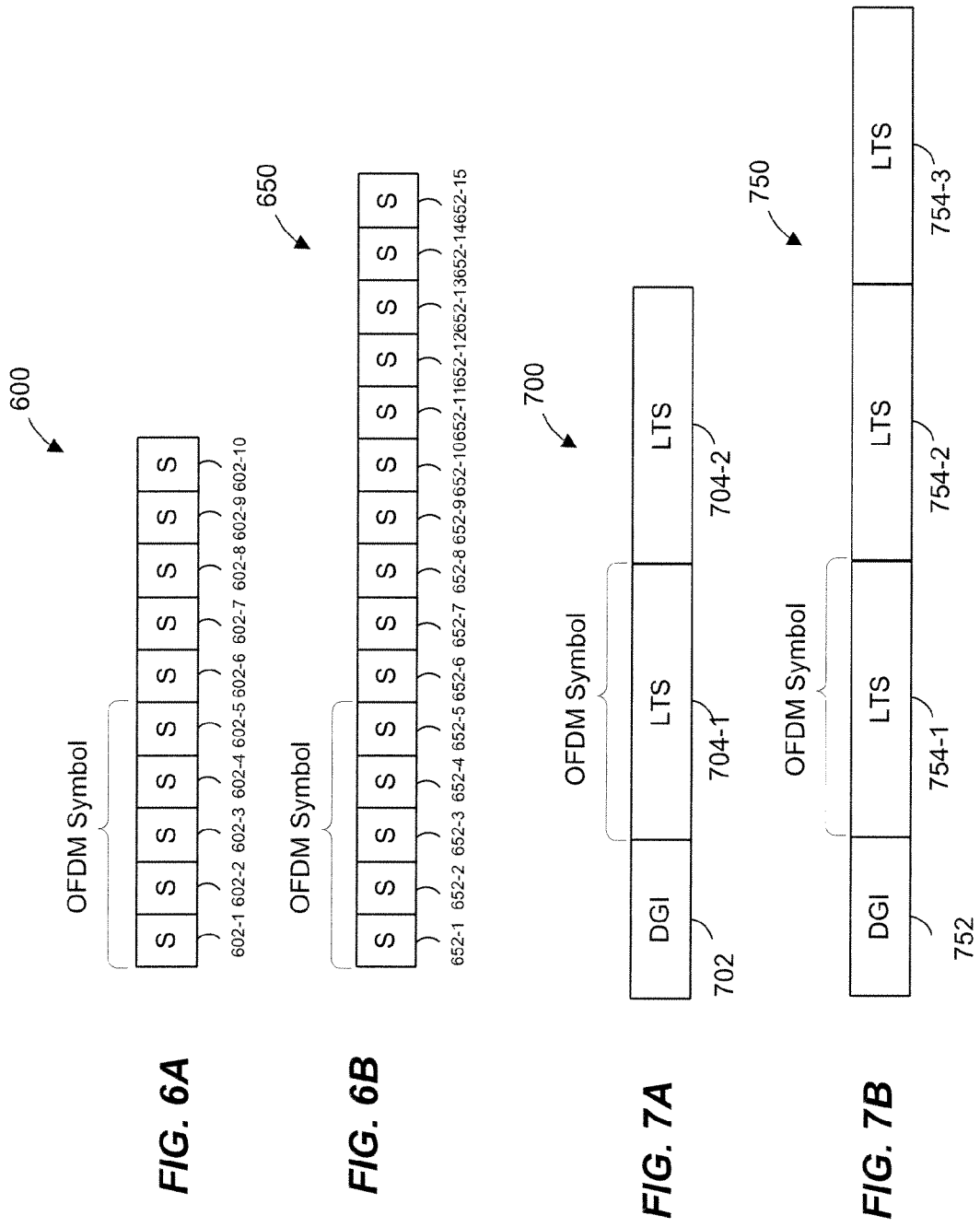

LOW BANDWIDTH PHY WITH FREQUENCY OFFSET CONSTRAINTS

CROSS-REFERENCES TO RELATED APPLICATIONS

This disclosure claims the benefit of U.S. Provisional Patent Application No. 61/515,227, entitled "Low Bandwidth PHY with frequency Offset Constraints," filed on Aug. 4, 2011, which is hereby incorporated by reference herein in its entirety.

FIELD OF THE DISCLOSURE

The present disclosure relates generally to communication networks and, more particularly, to long range low power wireless local area networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range.

Work has begun on a two new standards, IEEE 802.11ah and IEEE 802.1 af, each of which will specify wireless network operation in sub-1 GHz frequencies. Low frequency communication channels are generally characterized by better propagation qualities and extended propagation ranges compared to transmission at higher frequencies. In the past, sub-1 GHz ranges have not been utilized for wireless communication networks because such frequencies were reserved for other applications (e.g., licensed TV frequency bands, radio frequency band, etc.). There are few frequency bands in the sub-1 GHz range that remain unlicensed, with different specific unlicensed frequencies in different geographical regions. The IEEE 802.11ah Standard will specify wireless operation in available unlicensed sub-1 GHz frequency bands. The IEEE 802.11af Standard will specify wireless operation in TV White Space (TVWS), i.e., unused TV channels in sub-1 GHz frequency bands.

SUMMARY

In one embodiment, a method for estimating a carrier frequency offset (CFO) between a transmitting device and a receiving device includes receiving, at the receiving device, a data unit from the transmitting device, wherein the data unit includes a periodic sequence. The method also includes, at the receiving device, generating an initial phase shift value of a phase shift between adjacent periods of the periodic sequence and performing a plurality of cross-correlations using at least one period of the periodic sequence to generate a plurality of cross-correlation results, wherein each cross-correlation is performed using one of a plurality of possible actual phase shift values. The method additionally includes selecting, at the receiving device and based on the plurality of cross-correlation results, an actual phase shift value from the plurality of possible actual phase shift values. The method further includes generating an estimate of the CFO based at least in part on one of i) the initial phase shift value or ii) the actual phase shift value.

In another embodiment, an apparatus for estimating a carrier frequency offset (CFO) between a transmitting device and a receiving device comprises a network interface configured to receive a data unit transmitted from a transmitting device, wherein the data unit includes a periodic sequence. The apparatus also comprises a phase estimation unit configured to generate an initial phase shift value of a phase shift between adjacent periods of the periodic sequence and perform a plurality of cross-correlations using at least one period of the sequence to generate a plurality of cross-correlation results, wherein each cross-correlation is performed using one of a plurality of possible actual phase shift values. The phase estimation unit is also configured to select, based the plurality of cross-correlation results, an actual phase shift value from the plurality of possible actual phase shift values. The apparatus additionally comprises a CFO estimation unit configured to generate an estimate of the CFO based at least in part on one of i) the initial phase shift value or ii) the actual phase shift value.

In yet another embodiment, a method for estimating carrier frequency offset (CFO) between a transmitting device and a receiving device includes receiving, at the receiving device, a first data unit from the transmitting device via a communication channel, wherein the first data unit i) corresponds to a first physical layer (PHY) mode and ii) includes a first periodic sequence. The method also includes generating, at the receiving device and based on the first periodic sequence, a first carrier frequency offset (CFO) estimate between the receiving device and the transmitting device. The method additionally includes receiving a second data unit from the transmitting device via the communication channel, wherein the second data unit i) corresponds to a second PHY format and ii) includes a second periodic sequence, wherein the second periodic sequence is different than the first periodic sequence. The method further includes generating, based on the second periodic sequence, a second CFO estimate between the receiving device and the transmitting device.

In still another embodiment, a network device comprises a network interface configured to receive a first data unit from a transmitting device via a communication channel, wherein the first data unit i) corresponds to a first physical layer (PHY) format and ii) includes a first periodic sequence, and generate, based on the first periodic sequence, a first carrier frequency offset (CFO) estimate between the network device and the transmitting device. The network interface is also configured to receive a second data unit from the transmitting device via the communication channel, wherein the second data unit i) corresponds to a second PHY format and ii) includes a second periodic sequence, wherein the second periodic sequence is different than the first periodic sequence, and generate, based on the second periodic sequence, a second CFO estimate between the network device and the transmitting device.

BRIEF DESCRIPTION OF THE DRAWINGS

FIGS. 6A and 6B are diagrams of short training field of a normal mode data unit and an example short training field of a low bandwidth data unit, respectively, according to an embodiment;

FIGS. 7A and 7B are diagrams of long training field of a normal mode data unit and an example long training field of a low bandwidth data unit, respectively, according to an embodiment;

DETAILED DESCRIPTION

In embodiments described below, a wireless network device such as an access point (AP) of a wireless local area network (WLAN) transmits data streams to one or more client stations. The AP is configured to operate with client stations according to at least a first communication protocol. The first communication protocol defines operation in a sub-1 GHz frequency range, and is typically used for applications requiring long range wireless communication with relatively low data rates. The first communication protocol (e.g., IEEE 802.11af or IEEE 802.11ah) is referred to herein as a "long range" communication protocol. In some embodiments, the AP is also configured to communicate with client stations according to one or more other communication protocols which define operation in generally higher frequency ranges and are typically used for closer-range communications with higher data rates. The higher frequency communication protocols (e.g., IEEE 802.11a, IEEE 802.11n, and/or IEEE 802.11ac) are collectively referred to herein as "short range" communication protocols. In some embodiments, physical layer (PHY) data units conforming to the long range communication protocol ("long range data units") are the same as or similar to data units conforming to a short range communication protocol ("short range data units"), but are generated using a lower clock rate. To this end, in an embodiment, the AP operates at a clock rate suitable for short range operation, and down-clocking is used to generate a clock to be used for the sub-1 GHz operation. As a result, in this embodiment, a long range data unit maintains the physical layer format of a short range data unit, but is transmitted over a longer period of time.

In addition to this "normal mode" specified by the long range communication protocol, in some embodiments, the long range communication protocol also specifies a "low bandwidth mode" with a reduced bandwidth compared to the lowest bandwidth specified for the normal mode. In some such embodiments, data units corresponding to the low bandwidth mode ("low bandwidth mode data units") are generated using the same PHY format as defined for the lowest bandwidth PHY normal mode data, but using a higher down-clocking ratio compared to the down-clocking ratio used for generating normal mode data units. In some embodiments, the low bandwidth mode is used for operation in certain geographical regions in which lower bandwidth communication channels for sub-1 GHz WLAN communications are required or desirable.

Figure 1:
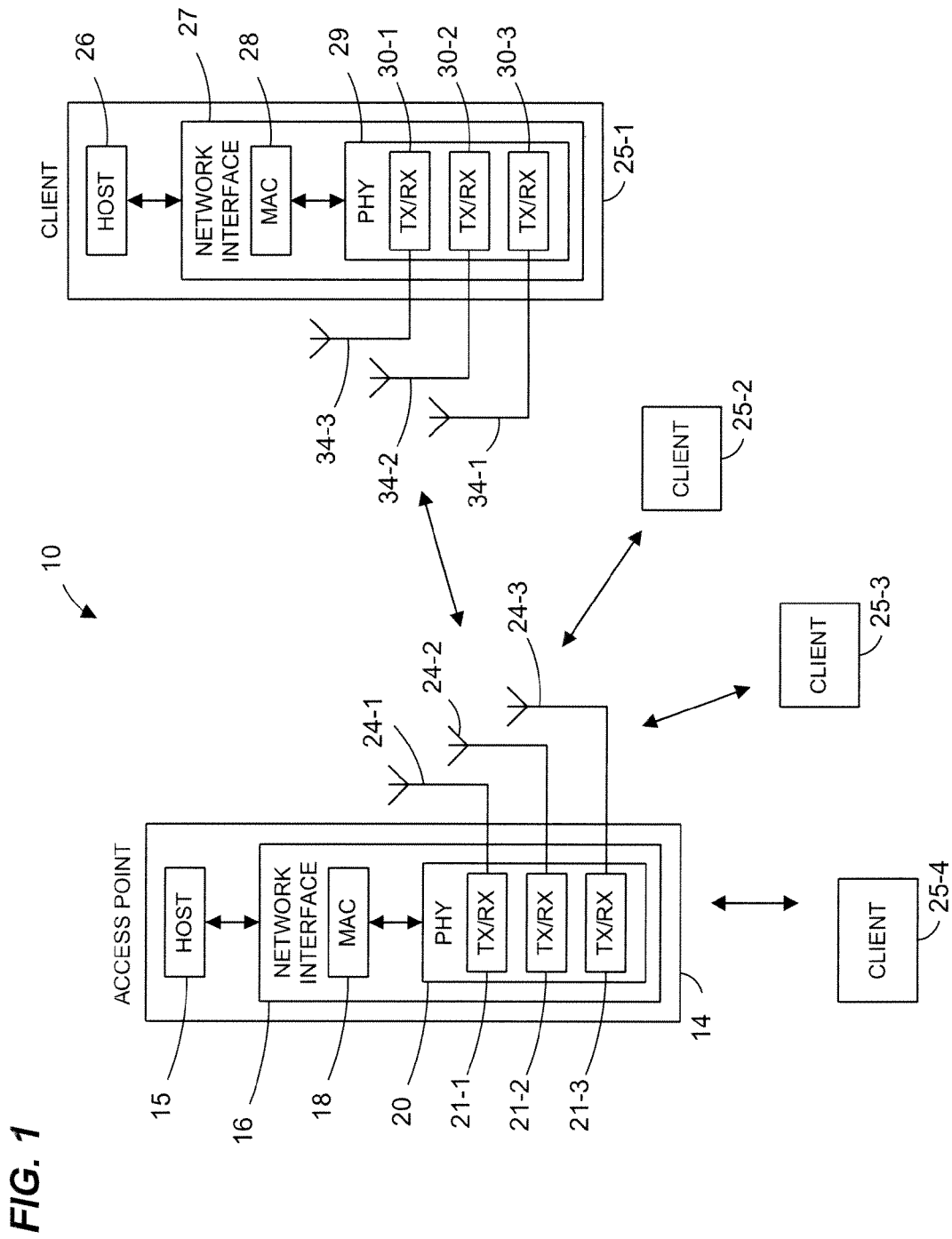
FIG. 1 is a block diagram of an example wireless local area network (WLAN), according to an embodiment.

FIG. 1 is a block diagram of an example WLAN 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the long range communication protocol. In some embodiments, at least one of the client stations 25 (e.g., client station 25-4) is a short range client station that is configured to operate at least according to one or more of the short range communication protocols.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In some embodiments, one, some, or all of the client stations 25-2, 25-3, and 25-4 has/have a structure the same as or similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the long range communication protocol and having formats described hereinafter. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is also configured to process received data units conforming to the long range communication protocol and having formats described hereinafter, according to various embodiments.

In various embodiments, the PHY processing unit 29 of the client device 25-1 is configured to generate data units conforming to the long range communication protocol and having formats described hereinafter. The transceiver(s) 30 is/are configured to transmit the generated data units via the antenna (s) 34. Similarly, the transceiver(s) 30 is/are configured to receive data units via the antenna(s) 34. The PHY processing unit 29 of the client device 25-1 is also configured to process received data units conforming to the long range communication protocol and having formats described hereinafter, according to various embodiments.

In some embodiments, the AP 14 is configured to operate in dual band configurations. In such embodiments, the AP 14 is able to switch between short range and long range modes of operation. According to one such embodiment, when operating in short range mode, the AP 14 transmits and receives data units that conform to one or more of the short range communication protocols. When operating in a long range mode, the AP 14 transmits and receives data units that conform to the long range communication protocol. Similarly, the client station 25-1 is capable of dual frequency band operation, according to some embodiments. In these embodiments, the client station 25-1 is able to switch between short range and long range modes of operation. In other embodiments, the AP 14 and/or the client station 25-1 is dual band device that is able to switch between different low frequency bands defined for long range operations by the long range communication protocol. In yet another embodiment, the AP 14 and/or the client station 25-1 is a single band device configured to operate in only one long range frequency band.

In still other embodiments, the client station 25-1 is a dual mode device capable of operating in different geographical regions with different channel bandwidth requirements. For example, in one such embodiment, the client station 25-1 is configured to utilize a normal mode PHY when operating in a first region, and to utilize a low bandwidth mode PHY when operating in a second region, for example, when the second region has a narrower available frequency spectrum compared to the frequency spectrum available in the first region. In an embodiment, the client station 25-1 switches between normal mode and the low bandwidth mode by switching between different down-clocking ratios used to generate the corresponding long range data.

In one example embodiment, client station 25-1 is a dual mode device that utilizes a normal mode PHY in the U.S. (e.g., for 2 MHz, 2.5 MHz and wider channels) and a low bandwidth mode PHY in Europe, Japan, Korea and/or China, e.g., with 1 MHz channels, 400 kHz channel, 200 KHz channel, or other bandwidth channels suitable for operation in these or other geographical regions. The same clock signal is used globally, in an embodiment, with different down-clocking ratios being utilized to generate data units for normal and low bandwidth modes (e.g. a 10× down-clocking ratio used for normal mode data units and a 20× down-clocking ration used for low bandwidth data units).

Figure 2:
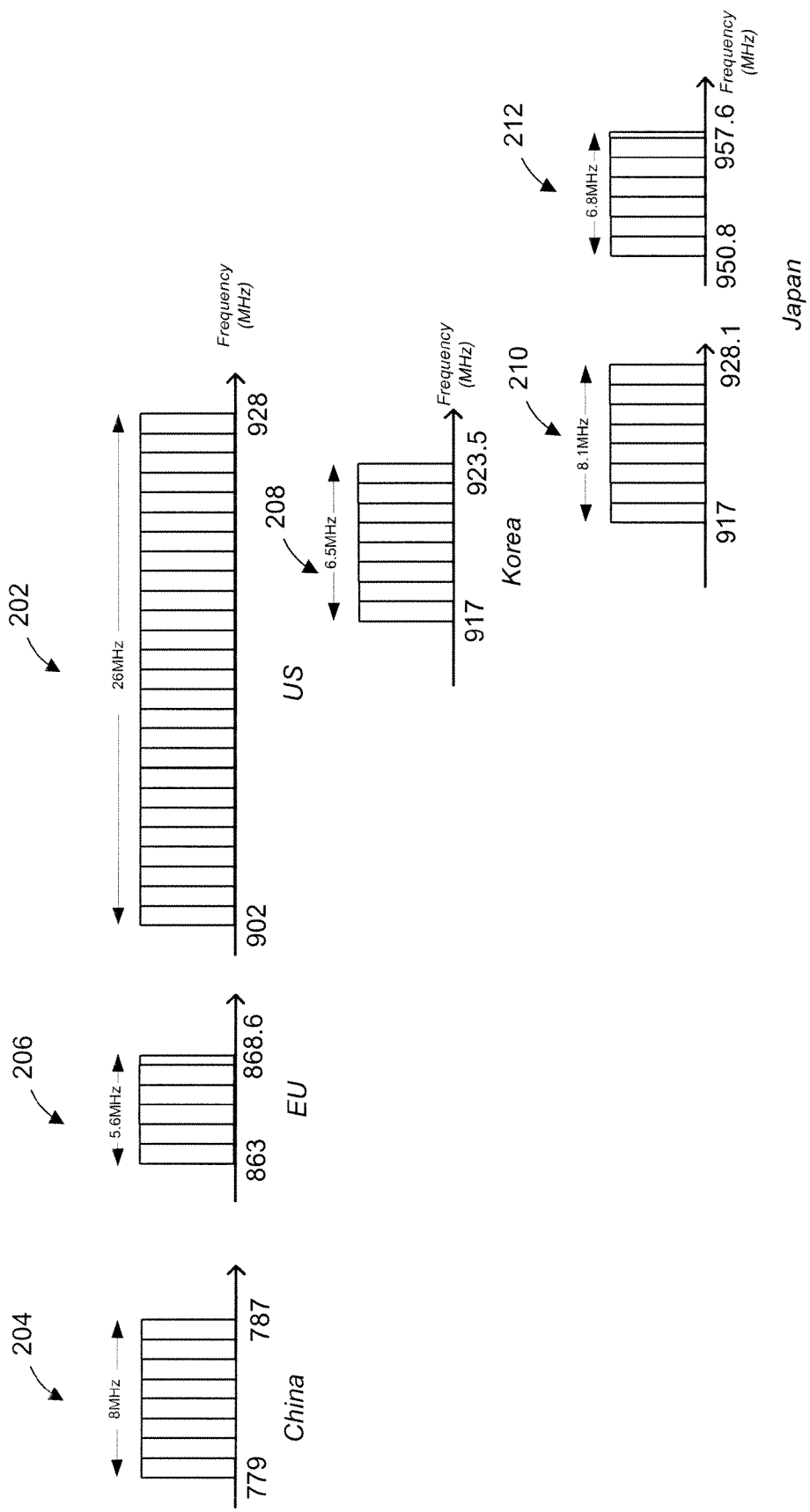
FIG. 2 is a frequency spectrum diagram illustrating some frequency bands in which different physical layer (PHY) modes are utilized, according to some embodiments.

FIG. 2 is a frequency spectrum diagram illustrating some frequency bands in which normal an low bandwidth PHY modes are utilized, according to some embodiments. For example, frequency band 202 in FIG. 2 is used for long range communication in the US, in one embodiment. In an embodiment, the AP 14 utilizes the normal mode with channel bandwidths of 2 MHz and higher when operating in the frequency band 202. Frequency bands 204 and 206 are used for long range communication in China and Europe, respectively. Because the frequency band 204 and the frequency band 206 is each considerably narrower compared to the frequency band 202 used in the US, in some embodiments, low bandwidth mode (e.g., using 1 MHz channels) is used for operation in the frequency bands 202 and 204, in at least some embodiments. Similarly, in some embodiments, low bandwidth mode is used in the frequency band 208 in Korea, and in one or both frequency bands 210 and 212 in Japan.

Further, in some embodiments, a low bandwidth mode is used for communication in some geographical regions having channel allocations utilizing even lower channel bandwidths. For example, in the 470 MHz to 510 MH frequency band in China, the maximum allowed channel bandwidth is 200 MHz. Also in China, in the frequency band between 430 MHz and 434 MHz, the maximum allowed channel bandwidth is 400 kHnz. In some embodiments, the AP 14 and one or more of the client stations 25 are configured for operation in such narrow bandwidth channels by using a low bandwidth mode that is different from the low bandwidth mode used for 1 MHz channelization. For example, in some embodiments, the low bandwidth mode used for communication in 1 MHz wide channels utilizes orthogonal frequency division multiplexing (OFDM) modulation, while the low bandwidth mode for narrower channels (e.g., 200 kHz or 400 kHz) channels utilizes single carrier transmission.

Figure 3:
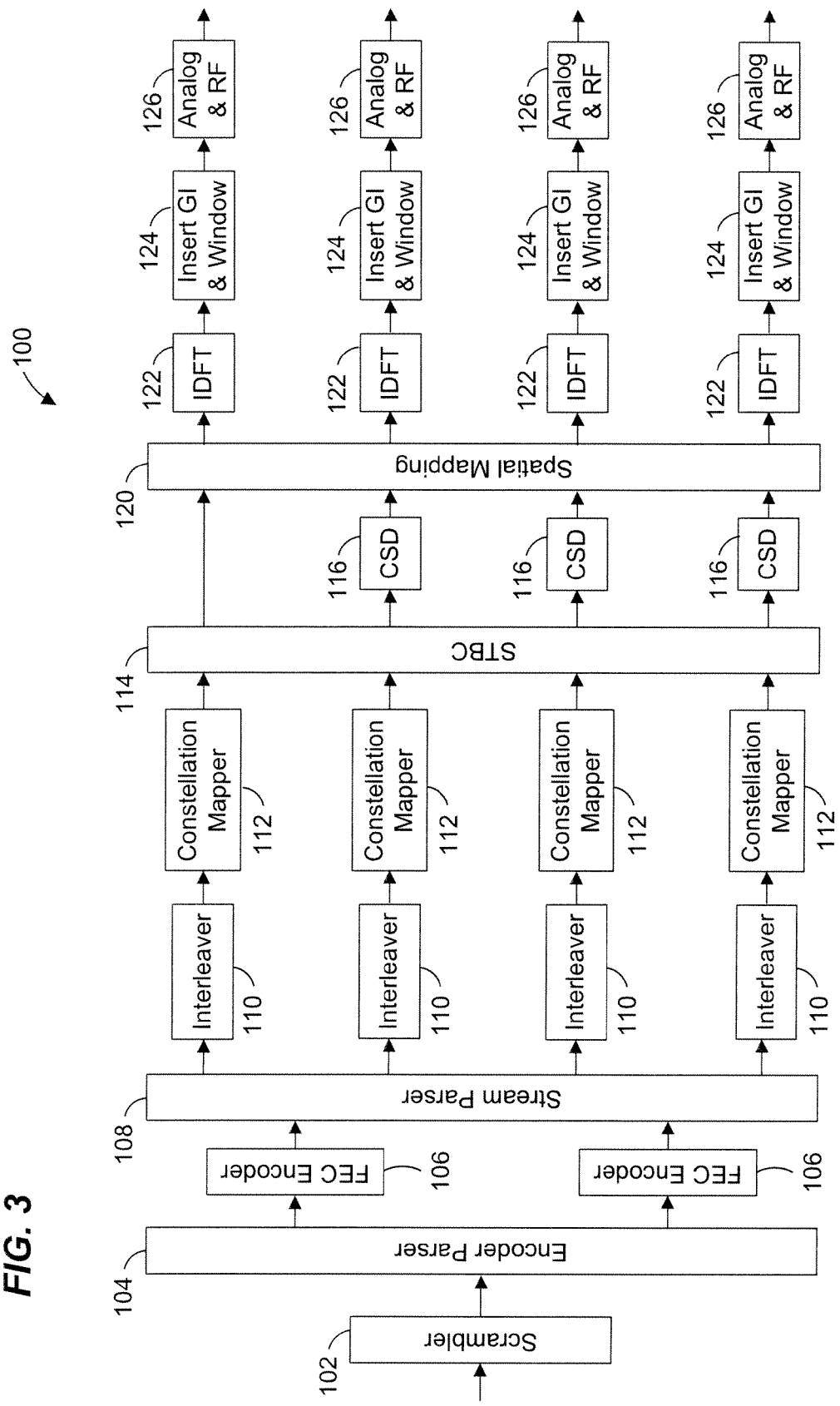
FIG. 3 is a block diagram of an example PHY processing unit configured to generate OFDM long range data units, according to an embodiment.

FIG. 3 is a block diagram of an example PHY processing unit 100 configured to generate OFDM long range data units, according to an embodiment. Referring to FIG. 1, the PHY processing unit 20 of AP 14 and the PHY processing unit 29 of client station 25-1 are each similar to or the same as PHY processing unit 100, in one embodiment. The PHY processing unit 100 includes a scrambler 102 that generally scrambles an information bit stream to reduce occurrences of long sequences of ones or zeros, according to an embodiment. An encoder parser 104 is coupled to the scrambler 102. The encoder parser 208 demultiplexes the information bit stream into one or more encoder input streams corresponding to one or more FEC encoders 106.

While two FEC encoders 106 are shown in FIG. 2, different numbers of FEC encoders are included, and/or different numbers of FEC encoders operate in parallel, in various other embodiments and/or scenarios. For example, according to one embodiment, the PHY processing unit 100 includes four FEC encoders 106, and one, two, three, or four of the FEC encoders 106 operate simultaneously depending on the particular modulation and coding scheme (MCS), bandwidth, and number of spatial streams. Each FEC encoder 106 encodes the corresponding input stream to generate a corresponding encoded stream. In one embodiment, each FEC encoder 106 includes a binary convolutional coder (BCC). In another embodiment, each FEC 106 encoder includes a BCC followed by a puncturing block. In another embodiment, each FEC encoder 106 includes a low density parity check (LDPC) encoder.

A stream parser 108 parses the one or more encoded streams into one or more spatial streams (e.g., four streams in the example PHY processing unit 100 shown in FIG. 2) for separate interleaving and mapping into constellation points/ symbols. In one embodiment, the stream parser 108 operates according to the IEEE 802.11n communication protocol, such that the following equation is satisfied:

$$s = \max\left\{1, \frac{N_{BPSCS}}{2}\right\} \quad \text{Equation 1}$$

where s is the number of coded bits assigned to a single axis in a constellation point for each of $N_{SS}$ spatial streams, and where $N_{BPSCS}$ is the number of bits per subcarrier. For each FEC encoder 106 (whether BCC or LDPC), consecutive blocks of s coded bits are assigned to different spatial streams in a round robin fashion, in an embodiment. In some embodiments where the set of FEC encoders 106 includes two or more BCC encoders, the outputs of the individual FEC encoders 106 are used in an alternating fashion for each round-robin cycle, i.e., initially S bits from the first FEC encoder 106 are fed into $N_{SS}$ spatial streams, then S bits from the second FEC encoder 106 are fed into the $N_{SS}$ spatial streams, and so on, where:

$$S = N_{SS} \times s \quad \text{Equation 2}$$

Corresponding to each of the $N_{SS}$ spatial streams, an interleaver 110 interleaves bits of the spatial stream (i.e., changes the order of the bits) to prevent long sequences of adjacent noisy bits from entering a decoder at the receiver. More specifically, the interleaver 110 maps adjacent coded bits onto non-adjacent locations in the frequency domain or in the time domain. The interleaver 110 operates according to the IEEE 802.11n communication protocol (i.e., two frequency permutations in each data stream, and a third permutation to cyclically shift bits differently on different streams), in an embodiment, with the exception that the parameters $N_{col}$, $N_{row}$, and $N_{rot}$ (i.e., number of columns, number of rows, and frequency rotation parameter, respectively) are suitable values based on the bandwidth of the long range, normal mode data units.

Also corresponding to each spatial stream, a constellation mapper 112 maps an interleaved sequence of bits to constellation points corresponding to different subcarriers/tones of an OFDM symbol. More specifically, for each spatial stream, the constellation mapper 112 translates every bit sequence of length $\log_2(M)$ into one of M constellation points, in an embodiment. The constellation mapper 112 handles different numbers of constellation points depending on the MCS being utilized. In an embodiment, the constellation mapper 112 is a quadrature amplitude modulation (QAM) mapper that handles M=2, 4, 16, 64, 256, and 1024. In other embodiments, the constellation mapper 112 handles different modulation schemes corresponding to M equaling different subsets of at least two values from the set {2, 4, 16, 64, 256, 1024}.

In an embodiment, a space-time block coding (STBC) unit 114 receives the constellation points corresponding to the one or more spatial streams and spreads the spatial streams to a number ($N_{STS}$) of space-time streams. In some embodiments, the STBC unit 114 is omitted. Cyclic shift diversity (CSD) units 116 are coupled to the STBC unit 114. The CSD units 116 insert cyclic shifts into all but one of the space-time streams (if more than one space-time stream) to prevent unintentional beamforming. For ease of explanation, the inputs to the CSD units 116 are referred to as space-time streams even in embodiments in which the STBC unit 114 is omitted.

A spatial mapping unit 120 maps the $N_{STS}$ space-time streams to $N_{TX}$ transmit chains. In various embodiments, spatial mapping includes one or more of: 1) direct mapping, in which constellation points from each space-time stream are mapped directly onto transmit chains (i.e., one-to-one mapping); 2) spatial expansion, in which vectors of constellation points from all space-time streams are expanded via matrix multiplication to produce inputs to the transmit chains; and 3) beamforming, in which each vector of constellation points from all of the space-time streams is multiplied by a matrix of steering vectors to produce inputs to the transmit chains. Each output of the spatial mapping unit 120 corresponds to a transmit chain, and each output of the spatial mapping unit 120 is operated on by an IDFT calculation unit 122 (e.g., an inverse fast Fourier transform (IFFT) calculation unit) that converts a block of constellation points to a time-domain signal. Outputs of the IDFT units 122 are provided to GI insertion and windowing units 124 that prepend to OFDM symbols, a guard interval ((I) portion, which is a circular extension of an OFDM symbol in an embodiment, and smooth the edges of OFDM symbols to increase spectral delay. Outputs of the GI insertion and windowing units 124 are provided to analog and radio frequency (RF) units 126 that convert the signals to analog signals and upconvert the signals to RF frequencies for transmission. In normal mode, the signals are transmitted in a 2 MHz, a 4 MHz, an 8 MHz, or a 16 MHz bandwidth channel (e.g., corresponding to a 64-, 128-, 256-, or 512-point IDFT at unit 122, respectively, and utilizing a clock rate that is constant regardless of IDFT size), while in low bandwidth mode the signals are transmitted in narrower bandwidth channels (e.g., 1 MHz channels) in various embodiments and/or scenarios. In some embodiments, the low bandwidth mode utilizes a 64-point IDFT with a clock rate that is lower than the clock rate used for normal mode operation. In other embodiments, other suitable channel bandwidths (and/or IDFT sizes) are utilized. Long range data units are discussed in more detail in U.S. patent application Ser. No. 13/359,336, filed on Jan. 6, 2012 and entitled "Physical Layer Frame Format for Long Range WLAN," which is hereby incorporated by reference herein in its entirety.

Figure 4:
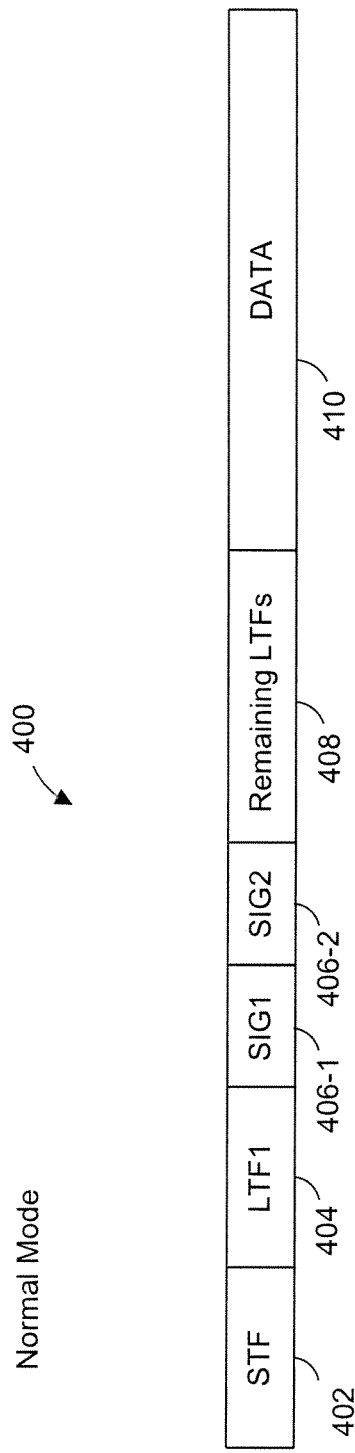
FIG. 4 is a diagram of a normal mode data unit, according to an embodiment.

FIG. 4 is a diagram of a normal mode data unit 400 that the AP 14 is configured to transmit to the client station 25-1 via orthogonal frequency domain multiplexing (OFDM) modulation, according to an embodiment. In an embodiment, the client station 25-4 is also configured to transmit the data unit 400 to the AP 14. The PHY processing unit 100 of FIG. 3 is configured to generate the data unit 400, according to an embodiment. The data unit 400 is a down-clocked version of a data unit conforming to a short range communication protocol. For the particular embodiment shown in FIG. 4, the data unit 400 is a down-clocked version of an IEEE 802.11n data unit using the "Greenfield" (rather than mixed mode) preamble. In other embodiments, the data unit 400 is a down-clocked version of a data unit conforming to another short range communication protocol. Different examples of normal mode data units according to various embodiments are described in U.S. patent application Ser. No. 13/359,336.

The data unit 400 corresponds to a lowest normal mode channel bandwidth (e.g., 2 MHz), and includes a short training field (STF) 402, a first long training field (LTF1) 404, a first signal (SIG1) field 406-1, a second signal (SIG2) field 406-2, remaining LTFs 410 (e.g., one additional LTF per spatial stream), and a data portion 412. Generally, the STF 402 is used for packet detection, initial synchronization, and automatic gain control, etc., the LTFs 404 are used for channel estimation and fine synchronization, and the SIG fields 406 are used to carry certain physical layer (PHY) parameters of the data unit 400, such as signal bandwidth (e.g., 2 MHz for data unit 400), modulation type, and coding rate used to transmit the data unit, for example.

Figure 5:
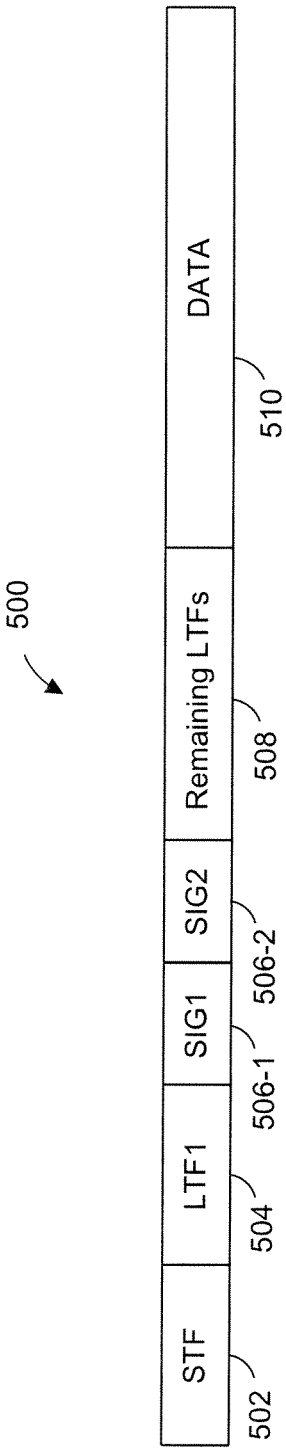
FIG. 5 is a diagram of a low bandwidth mode data unit, according to an embodiment.

FIG. 5 is a diagram of a low bandwidth mode long range data unit 500 that the AP 14 is configured to transmit to the client station 251—via orthogonal frequency domain multiplexing (OFDM) modulation, according to an embodiment. In an embodiment, the client station 25-4 is also configured to transmit the data unit 500 to the AP 14. The PHY processing unit 100 of FIG. 3 is configured to generate the data unit 500, according to an embodiment. The data unit 500 is a down-clocked version of a data unit conforming to a short range communication protocol, using a down-clocking ratio that is higher than the down-clocking ration used for the normal mode data unit 400 of FIG. 4. For the particular embodiment shown in FIG. 5, the data unit 500 is a down-clocked version of an IEEE 802.11n data unit using the "Greenfield" (rather than mixed mode) preamble. In other embodiments, the data unit 500 is a down-clocked version of a data unit conforming to another short range communication protocol.

In various embodiments, the low bandwidth data unit 500 has a PHY format that is the same as or similar to the PHY format of the normal mode data unit 400 of FIG. 4. As illustrated in FIG. 5, the low bandwidth data unit 500 includes a short training field (STF) 502, a first long training field (LTF1) 504, a first signal (SIG1) field 306-1, a second signal (SIG2) field 506-2, remaining LTFs 510 (e.g., one additional LTF per spatial stream), and a data portion 512. According to an embodiment, each of the STF field 502, the LTF1 field 504, the SIG fields 506 and the remaining LTF fields 508 are the same as the corresponding fields of the data unit 400 of FIG. 4. Alternatively, in another embodiment, one or more of the STF field 502, the LTF1 field 304, the SIG fields 506 and the remaining LTF fields 508 is/are different in some aspects from the corresponding field(s) of the normal mode data unit 300.

In various embodiments and/or scenarios, A receiving device (e.g., the client station 25-1 or the AP 14) utilizes the STF field (e.g. the STF field 402 in FIG. 4 or the STF field 502 in FIG. 5) of a received data unit to estimate and correct for the carrier frequency offset (CFO) caused by the carrier frequency mismatch between the receiving and a transmitting device. In an embodiment, CFO is caused by a delta in frequency between a local oscillator used to up-convert the data unit to a desired carrier frequency by a transmitting device and a local oscillator used to down-convert the data unit from the carrier frequency at the receiving device. If not corrected, carrier frequency offset leads to a decreased PHY performance at the receiving device, in various embodiments and/or scenarios. To perform CFO correction, a receiving device generates an estimate of the phase shift between adjacent periods of a periodic training sequence included in the STF field of a data unit, and then generates a carrier frequency offset estimate based on the phase offset estimate, according to an embodiment. In at least some embodiments, due to a larger down-clocking ratio used to generate low bandwidth data units compared to the down-clocking ratio used for generating normal mode data units, carrier frequency offset has a greater impact on PHY performance in low bandwidth mode than in normal mode. In some embodiments, low bandwidth data unit PHY format differs from the normal mode data unit PHY format in some aspects to allow a receiving device to obtain a more accurate CFO estimate (or estimate of the CFO), thereby improving PHY performance of the receiving device in low bandwidth mode.

In some such embodiments, a low bandwidth mode STF, used for phase shift estimation in low bandwidth, includes aperiodic training sequence with a greater number of sequence repetitions compared to the number of repetitions in a normal mode data unit, allowing a receiving device to average phase offset over a greater number of STF periods. FIGS. 6A-6B are diagrams of an STF field 600 of a normal mode data unit (such as field 302 of FIG. 3) and an STF field 650 of a low bandwidth data unit (such as the STF field 502 of FIG. 4), respectively, according to one such embodiment. As illustrated in FIG. 6A, in this embodiment, the STF field 600 of a normal mode data unit includes 10 repetitions of a sort training sequence (S) 602. As illustrated, the STF field 600 is transmitted over two OFDM symbol, each OFDM symbol having five repetitions of the training sequence 652. Referring now to FIG. 6B, in an embodiment, an STF field 650 of a low bandwidth data unit includes 15 repetitions of a short training sequence (S) 652. In this embodiment, the STF field 650 is transmitted over three OFDM symbol, each OFDM symbol having five repetitions of the training sequence 652. In other embodiments, a low bandwidth data includes a different suitable number of short training sequence repetitions (e.g., 11, 12, 13, 14, 16, etc.) and/or is transmitted over any suitable number of OFDM symbols (e.g., 4, 5, 6, etc), with the number of short training sequence repetitions and the number of OFDM symbols in an STF field of a low bandwidth data unit generally the same as of greater than in a normal mode data unit.

Similarly, in some embodiments, a low bandwidth data unit (e.g., the data unit 500 of FIG. 5) includes more repetitions of a long training sequence compared to the number of long training sequence repetitions included in a normal mode data unit (e.g., the data unit 400 of FIG. 4). The greater number of long training sequence repetitions allows a receiving device to obtain more precise fine frequency tuning, for example, according to an embodiment. FIGS. 7A-7B are diagrams of an LTF field 700 included in a normal mode data unit (e.g., LTF1 field 404 in FIG. 4) and an LTF field 750 included in a low bandwidth mode data unit (e.g. the LTF1 field 505 in FIG. 5), respectively, according to one such embodiment. As illustrated in FIG. 7A, in this embodiment, the LTF field 700 of a normal mode data unit includes a guard interval 702 followed by two repetitions of a long training sequence 704. Referring now to FIG. 7B, the LTF1 field 750 of a low bandwidth mode data includes a guard interval 752 followed by three repetitions of a long training sequence 754. In other embodiments, a low bandwidth data (such as the data unit 400 of FIG. 5) unit includes any other suitable number (e.g., 11, 12, 13, 14, 16, etc.) of long training sequence repetitions and/or occupies a suitable different number of OFDM symbols (e.g., 4, 5, 6, etc), with the number of long training sequence repetitions and the number of OFDM symbols in an LFT field of a low bandwidth data unit generally the same as of greater than in a normal mode data unit.

As discussed above, to actually obtain an carrier frequency offset estimate, a receiving device receiving a data unit first determines or estimate a phase shift between adjacent periods of the periodic sequence ("inter-period phase shift") in the STF field of the data unit. To this end, the receiving device performs autocorrelation over a desired number of periods of the training sequence, and generates a phase shift estimate based on the autocorrelation results, according to an embodiment. However, in some embodiments and/or situations, the receiving device is unable to unambiguously determine the inter-period STF phase shift based solely on the autocorrelation results. In such embodiments or situations, the phase shift value determined based on auto-correlation of the training sequence corresponds to one of several possible actual phase shift values. To resolve the such phase shift ambiguities, in an embodiment, the receiving device generate an initial phase shift estimate via autocorrelation over one a certain number of periods of the training sequence, and then performs several cross-correlations using the several possible actual phase shift values that correspond to the initial phase shift estimate to resolve the phase ambiguities.

Figure 8:
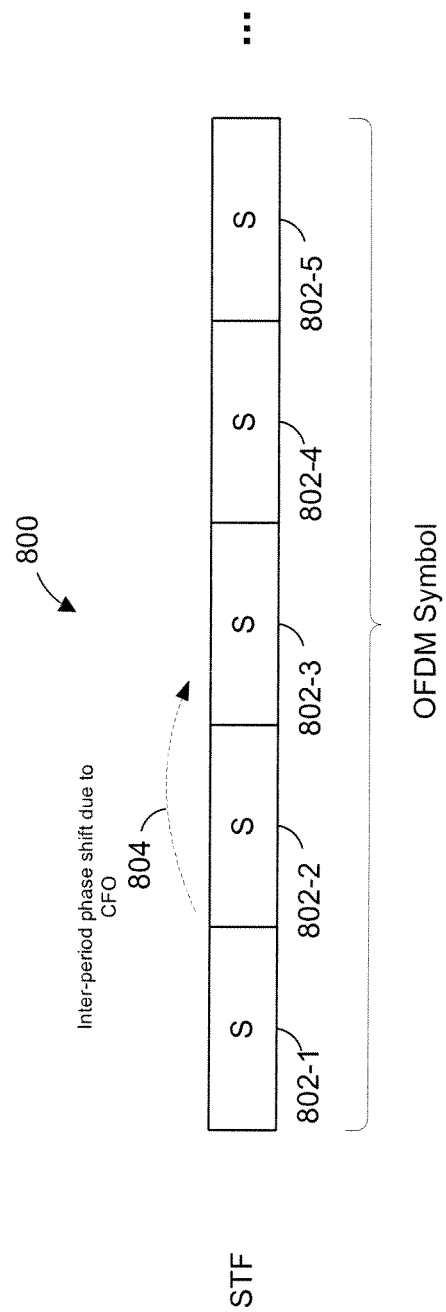
FIG. 8 is a diagram of a short training field used for carrier frequency offset estimation, according to an embodiment.

FIG. 8 is a diagram of an STF field 800 used for carrier frequency offset estimation, according to an embodiment. As shown, in the embodiment of FIG. 8, the short training field 800 corresponds to one OFDM symbol and includes a periodic training sequence with five repetitions of a sequence (S) 802. In an embodiment, the receiving device generates an initial phase shift estimate θ corresponding to the phase shift between corresponding modulation symbols in two adjacent periods of the short training field 800, as illustrated by the arrow 804.

In general, a receiving device is able to unambiguously estimate the phase shift using autocorrelation of a training sequence as long as the phase shift between two adjacent periods of the training sequence is within "a directly correctable region" between negative π radians and positive π radians (−π to π), according to an embodiment. In an embodiment, because such inter-period phase shift is caused by frequency offset between a transmitting and a receiving device, the maximum inter-period phase shift is determined by local oscillator tolerance in the receiving and in the transmitting device. In an embodiment, a receiving device (e.g., client station 25-1) and a transmitting device (e.g., the AP 14) operating in accordance with a long range communication protocol each utilizes a local oscillator having a precision tolerance of ±20 parts per million (ppm) relative to the carrier frequency, as specified by the long range communication protocol. In this embodiment, with an example carrier frequency of 950 MHz, the maximum frequency offset between the receiving device and the transmitting device caused by a delta in frequency between the local oscillator in the receiving device and the local oscillator in the transmitting device is given by 950 MHz*40 ppm=38 kHz. With a training sequence periodicity having a period of period of 0.8 μs (as defined in the IEEE-802.11n Standard or the IEEE-802.11ac Standard) and a down-clocking ratio of 20×, the maximum inter-period phase shift in the STF field, in this embodiment, is given by θ=2π×0.8×20e−6×38e3=1.216π. Because this maximum phase shift is outside of the directly correctable region of −π to π, in this embodiment, the phase shift cannot be corrected directly for certain values of the phase shift θ due to phase shift ambiguity. In particular, in this embodiment, if the initial phase shift θ estimate is in the range of π/2 radians to π radians (π/2 to π), then the actual phase shift corresponds to either θ or θ−2π. Similarly, if the initial estimated phase shift θ is in the range of −πradians to π/2 radians (−π to π/2), then the actual phase shift corresponds to either θ or θ+2π.

According to an embodiment, in order to resolve such phase shift ambiguity, a receiving device performs several cross-correlations using the training sequence to "test" several possible phase shift values. Cross-correlation to resolve phase ambiguity is performed only when the initial value of θ does not correspond to a phase shift value in a directly correctable region (e.g., corresponds to a value outside of the directly correctable region of −π to π), according to an embodiment. In this embodiment, when the initial phase shift θ estimate corresponds to a value within the directly correctable region, the receiving device utilizes the initial phase shift θ, directly, to generate an estimate of the carrier frequency offset. In other words, because there is no phase shift ambiguity when the initial phase shift θ within the directly correctable region, and in this case, cross-correlations for ambiguity resolution need not be performed.

Figure 9:
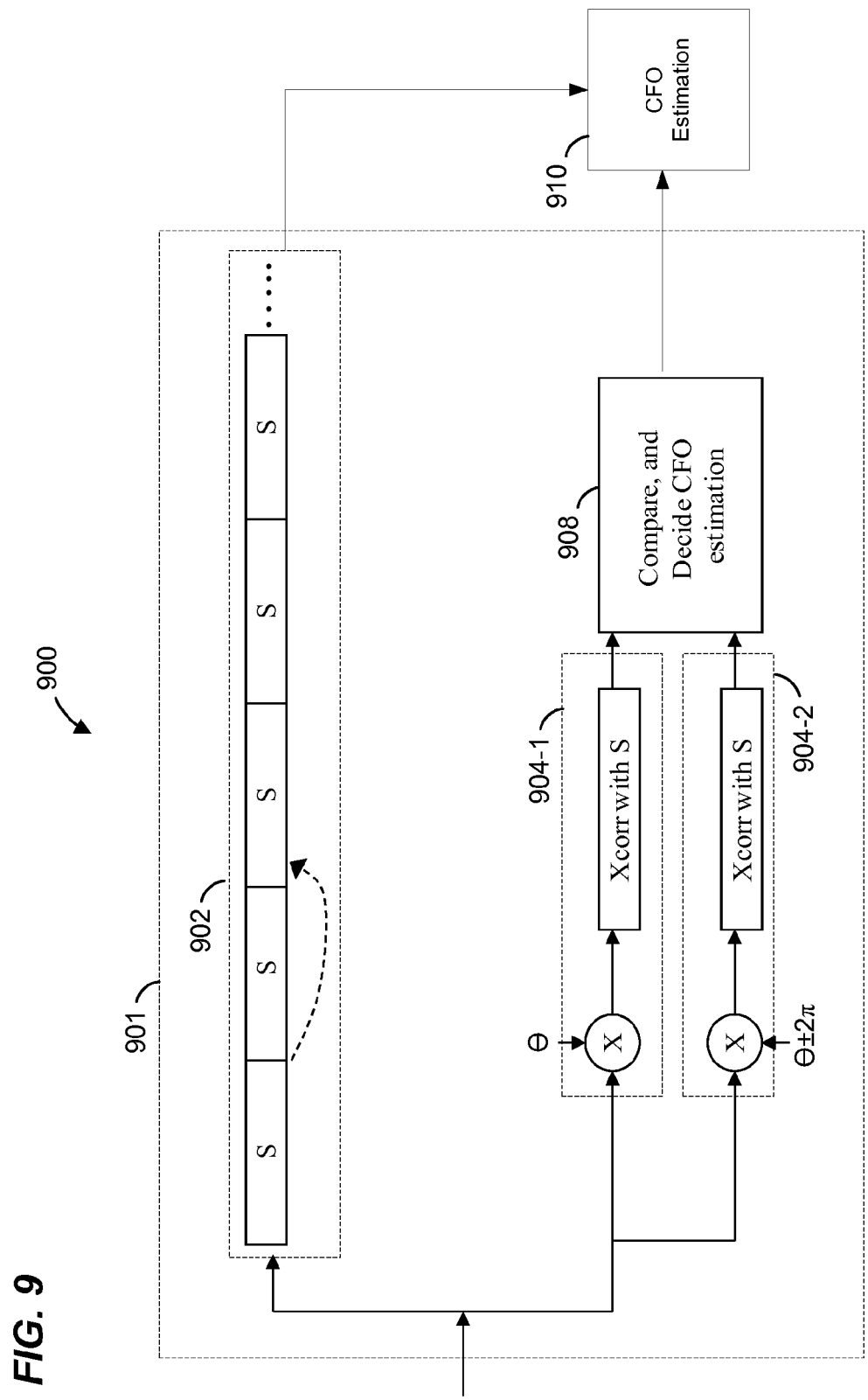
FIG. 9 is a diagram of a phase estimation system capable of resolving phase shift ambiguity, according to an embodiment.

FIG. 9 is a diagram of a CFO estimation system 900 capable of phase shift ambiguity resolution, according to an embodiment. The CFO estimation system 900 is included in the PHY processing unit 20 of FIG. 1, according to one embodiment. The CFO estimation system 900 is included in the PHY processing unit 29 of FIG. 1, according to another embodiment. In the illustrated embodiment, the CFO estimation system 900 includes a phase estimation unit 901 and a CFO estimation unit 910. The phase estimation unit 901, in turn, includes an autocorrelation module 902, a first cross-correlation module 904-1, a second cross-correlation module 904-2 and a comparison module 908. In an embodiment, the autocorrelation module 902 is used for packet detection and initial frequency offset estimation. Once an incoming data unit has been detected, in an embodiment, the autocorrelation module 902 performs autocorrelation to generate an initial phase shift θ estimate using a periodic training sequence included in the STF of the data unit. In some embodiments, the autocorrelation module 902 generates several θ estimates based on several periods of the training sequence, and an average of the θ estimates is used as the initial phase shift θ estimate, thereby improving accuracy of the initial phase shift θ estimate. In any case, when the initial phase shift estimate θ generated by the autocorrelation module 902 is outside of the directly correctable region of −π to π, the actual phase shift cannot be unambiguously determined based solely on the autocorrelation result. For example, in an embodiment with a 40 ppm maximum local oscillator mismatch between the receiving end and the transmitting end, the actual phase shift, in this case, corresponds to either the initial phase shift θ or to the initial shift θ rotated by the value of 2π. In an embodiment, to resolve this phase shift ambiguity, the first cross-correlation module 904-1 correlates the (known) training sequence with a version of the received training sequence shifted by the value of θ, while the second cross-correlation unit 904-2 correlates the known training sequence with a version of the received training sequence shifted by the value of θ+2π (if the estimated value of θ is in the range of π/2 to π) or by the value of θ−2π (if the estimated value of θ is in the range of −π to π/2). That is, in this embodiment, each cross correlation module 904 correlates the training sequence with a version of the incoming training sequence shifted by one of the possible phase shift values. Equivalently, in another embodiment, the possible phase shifts values are inserted into the training sequence and cross-correlation between the received training sequence and each of the phase shifted training sequences is performed. In either case, the comparison module 908 then compares the outputs of the cross-correlation modules 904 and selects the actual phase shift value (θ or θ±2π), based on which of the two possible values of the actual phase shift values produces a higher correlation. The CFO estimation module 910 then generates a CFO estimate based on the initial phase shift estimate if the initial phase shift θ is within the directly correctable region, or based the actual phase shift value if the initial phase shift θ is outside of the directly correctable region, according to an embodiment.

In the embodiment of FIG. 9, the CFO estimation system 900 includes two cross-correlation modules 904 allowing the CFO estimation system 900 to resolve phase shift ambiguity between two possible actual phase shift values. In other embodiments, the CFO estimation system 900 includes additional cross-correlation units 904 that enable the CFO estimation system 900 to distinguish between additional possible phase shift values. For example, in one embodiment, the CFO estimation system 900 includes five cross-correlation modules 904 allowing the CFO estimation system 900 to resolve phase shift ambiguity between five possible phase shift values (e.g., θ, θ−2π, θ+2π, θ−4π, θ+4π). In other embodiments, the CFO estimation system 900 includes any other suitable number of cross-correlation units 904 (e.g., 3, 4, 6, 7, 8 etc.) and is able to resolve phase shift ambiguity between any other number phase shift possibilities.

In another embodiment, to ensure that the maximum inter-period phase shift in a short training field periodic sequence is always directly correctable at a receiving device, the long range communication protocol specifies a short training sequence period for low bandwidth data units that is shorter than the short training sequence period used in normal mode. For example, a training sequence to be used in a normal mode data unit is generated by inserting non-zero values every four tones of an OFDM symbol, and a training sequence to be used in a low bandwidth mode is generated by inserting non-zero values every eight tones of an OFDM symbol, according to one embodiment. Accordingly, in this embodiment, the training sequence period of a low bandwidth data unit is shorter than the training sequence period of a normal mode data unit by a factor of two. This reduced period of the short training sequence ensures that the initial phase shift estimate at a receiving device will be within the directly correctable region with a maximum frequency offset of 40 ppm between the receiving device and a transmitting device, according to an embodiment.

Figure 10:
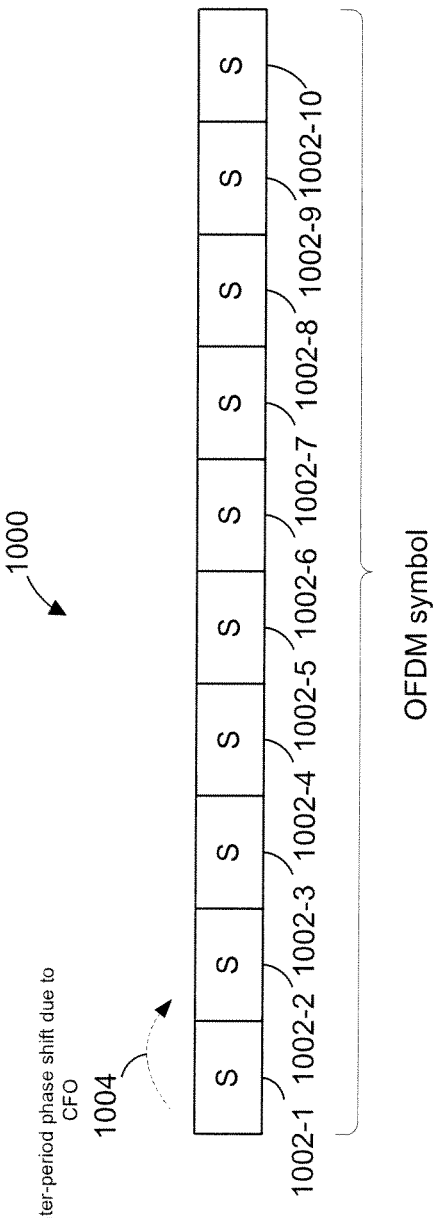
FIG. 10 is a diagram of another example short training field used for carrier frequency offset estimation, according to an embodiment.

FIG. 10 is a diagram of an STF field 1000 that includes a periodic training sequence with a shorter period compared to a normal mode SFT field, according to one such embodiment. The STF field 1000 is similar to the STF field 800 of FIG. 8, accept that each OFDM symbol in the STF field 1000 includes ten repetitions of the training sequence 1002 compared to five training sequence repetitions in an OFDM symbol of the STF field 800 in FIG. 8. In an embodiment, a device receiving the STF field 1000 generates an initial phase shift θ estimate based on adjacent periods of the short training field 1000 as indicated in FIG. 9 by the arrow 1004. In this case, in an embodiment in with a 20× down-clocking ratio used in low bandwidth mode and with local oscillator tolerance of 20 ppm at both the receiving and the transmitting device, the maximum phase shift between two STF periods due to CFO is given by θ=2π×0.4×20e−6×38e3=0.608π. Because in this case the maximum phase shift is less than π, CFO is always directly correctable at the receiving device in this embodiment.

In yet another embodiment, in order to allow for direct CFO correction in low bandwidth mode, the long range communication protocol specifies a tighter local oscillator tolerance for low bandwidth mode operation. For example, in one embodiment, 16 ppm with respect to carrier is specified, ensuring that the maximum inter-period phase shift in a training sequence of an STF field is within the directly correctable region. In such embodiments, if low bandwidth data units include a longer STF training sequence compared to the STF field of normal mode data units, a receiving device is able to use the extra training sequence periods to obtaining a more reliable CFO estimate by averaging phase shift estimates over a greater number of the training sequence periods.

In some embodiments and/or scenarios, single carrier modulation (rather than OFDM modulation) is used for low bandwidth mode operation, for example for communication in lower bandwidth channels such as channels with bandwidths narrower than 1 MHz. In some such embodiments, low bandwidth mode data units are generated as a down-clocked versions of a long range communication protocol that specifies single carrier data unit format, such as the IEEE-802.11b Standard, for example. In one embodiment, normal mode data units are OFDM data unit, and low bandwidth mode data units are single carrier data units. In another embodiment, single carrier data units are used in both normal mode and low bandwidth mode. For example, both normal mode and low bandwidth mode data units are generated according to a IEEE-802.11b Standard, with low-bandwidth data units down-clocked with a higher down-clocking ratio compared to the down-clocking ratio used for normal range data units, according to an embodiment. In some embodiments, single carrier low bandwidth mode data units are used in geographical regions in which communication channels are limited to a bandwidth that is lower than 1 MHz, for example. In an embodiment, WLAN devices (such as the AP 14 and/or the client station 25-1) utilize such single carrier low bandwidth data units for operation in frequency bands in China in which a maximum channel bandwidth of 200 kHz or 400 kHz is allowed (discussed in more detail above in connection with FIG. 2).

Figure 11:
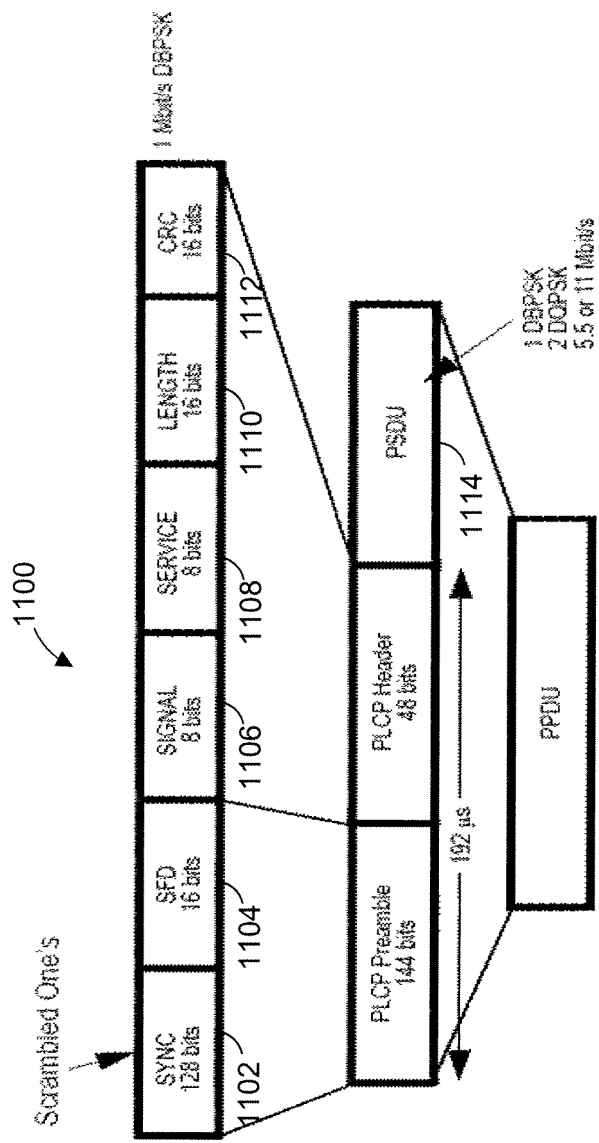
FIG. 11 is a diagram of a single carrier (SC) low bandwidth mode data unit, according to an embodiment.

FIG. 11 is a diagram of a single carrier (SC) low bandwidth mode data unit 1100 that the client station AP 14 configured to transmit to the client station 25-4 via single carrier modulation, according to an embodiment. In an embodiment, the client station 25-4 is also configured to transmit the data unit 1100 to the AP 14. In the embodiment shown in FIG. 11, the data unit 1100 is a down-clocked version of an IEEE 802.11b data unit using the "long preamble" (rather than the "short preamble"). The data unit 1100 includes a SYNC field 1102 that allows a receiver to detect presence of a data unit and begin synchronizing with the incoming signal. In the embodiment of FIG. 11, the SYNC field 1102 is composed of 128 bits having values of scrambled ones. The data 1100 also include a start frame delimiter (SFD) field 1104 that signals the beginning of a frame. The SYNC field 1102 and the SFD field 1104 form the "long preamble" portion of the data unit 1100. The data unit 1100 also includes a header portion containing the SIGNAL field 1106, the SERVICE field 1108, a LENGTH field 1110, and CRC field 1112. The data unit 1100 also includes a physical layer service data unit (PSDU), i.e., the data portion 1114.

Figure 12:
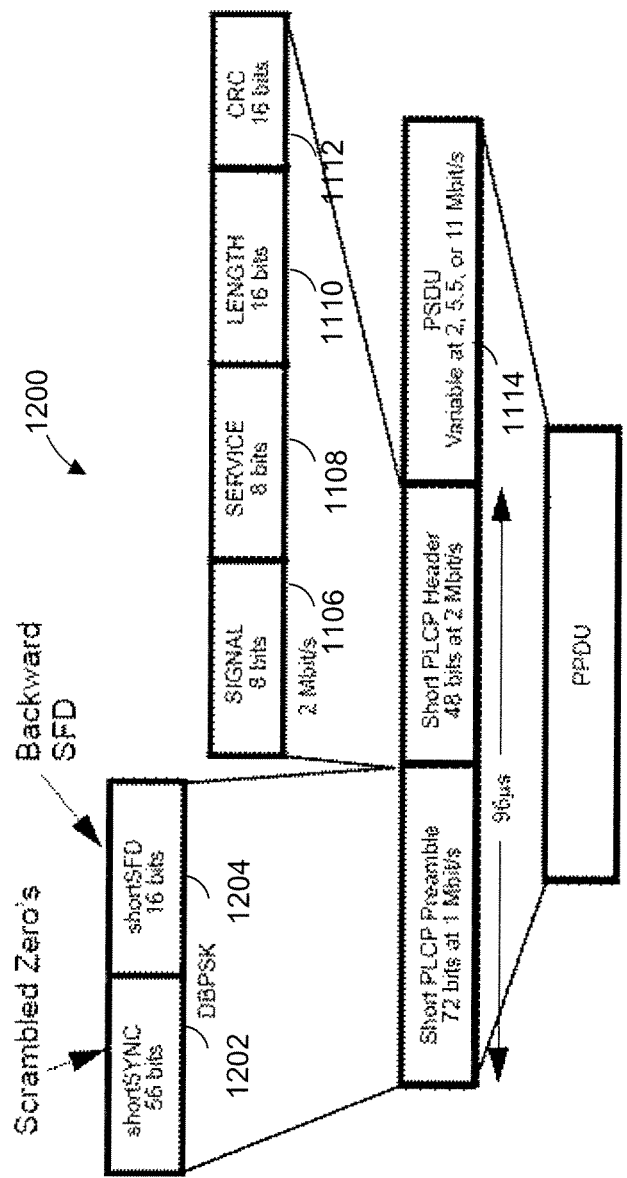
FIG. 12 is a diagram of a single carrier (SC) low bandwidth data unit, according to another embodiment.

FIG. 12 is a diagram of a single carrier (SC) low bandwidth data unit 1200 that the client station AP 14 configured to transmit to the client station 25-4 via single carrier modulation, according to an embodiment. In an embodiment, the client station 25-4 is also configured to transmit the data unit 1200 to the AP 14. In the embodiment shown in FIG. 12, the data unit 1200 is a down-clocked version of an IEEE 802.11b data unit using the "short preamble" (rather than the "long preamble"). The data unit 1200 includes a short SYNC field 1202 that allows a receiver to detect presence of a data unit and begin synchronizing with the incoming signal. In the embodiment of FIG. 12, the SYNC field 1202 is composed of 56 bits having values of scrambled zeros. Similar to the data unit 1100 of FIG. 11, the data 1200 also include a start frame delimiter (SFD) field 1204 that signals the beginning of a frame. The SYNC field 1202 and the SFD field 1204 form the "short preamble" portion of the data unit 1200. The data unit 1200 also includes a header portion containing the SIGNAL field 1206, the SERVICE field 1208, a LENGTH field 1210, and CRC field 1212. The data unit 1200 also includes a physical layer service data unit (PSDU), i.e., the data portion 1214.

In an embodiment, the AP 14 is configured to transmit SC data units (such as the data unit 1110 of 11 or the data unit 1200 of FIG. 12) to the client station 25-1 in channels having suitably low bandwidths, such as 200 kHz channel bandwidth or 400 kHz channel bandwidth. According to an embodiment, in order to allow a transmitting device (e.g., the AP 14 of the client station 25-1) to filter such low bandwidth data units in frequency domain to meet certain spectral map requirements, for example, the Nyquist rate used to generate such low bandwidth data units corresponds to a bandwidth that is lower than the actual bandwidth of the channel in which the low bandwidth data unit is to be transmitted. For example, in an embodiment in which the bandwidth of the channel used to transmit a low bandwidth data unit is 200 kHz, low bandwidth mode data units are generated with a Nyquist rate corresponding to a 110 kHz bandwidth data unit. In an embodiment in which low bandwidth data units are down-clocked with respect to the IEEE-802.11b Standard PHY format, the down-clocking ratio needed to achieve this Nyquist rate is 100 (100×). As another example, in other embodiments, a down-clocking ratio in the range of 55× to 100× is used to generate low bandwidth data units at a corresponding Nyquist rate in the range of 110 kHz to 200 kHz. Similarly, to generate a low bandwidth data unit for transmission in a 400 kHz channel, in an embodiment, a down-clocking ration of 50 (50×) is used, resulting in the Nyquist rate corresponding to a 220 kHz bandwidth data unit. As another example, in another embodiment, low-bandwidth data units transmitted in a 400 kHz channel are generated with down-clocking ratios in the range of 25.7× to 50× resulting in Nyquist rates corresponding to 220 kHz to 400 kHz bandwidth data units. Typically, higher Nyquist rates lead to more stringent filter requirements at the transmitting device to allow the transmitting device to meet system spectral mask requirements by limiting transmission in neighboring channels to an acceptably low power level, according to an embodiment.

Figure 13:
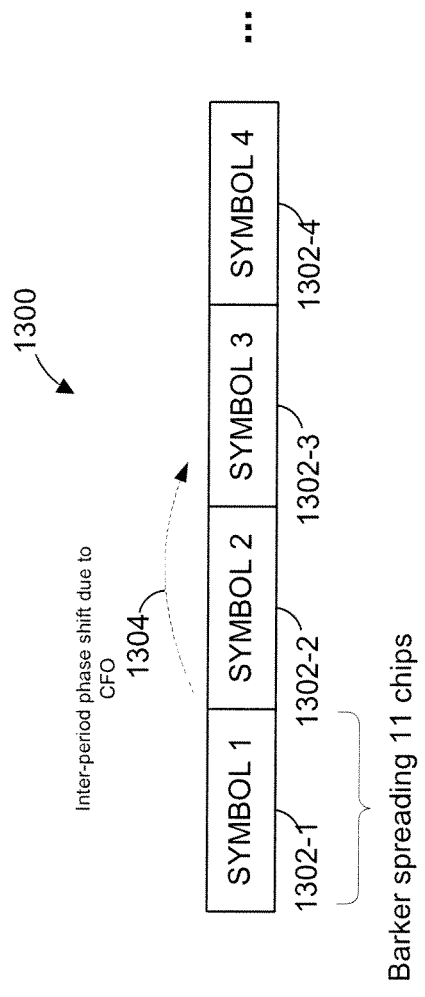
FIG. 13 is a diagram of a synchronization field used to estimate inter-symbol phase shift between two adjacent symbols, according to an embodiment.

Generally, the SYNC field of a short preamble or a long preamble (e.g., The SYNC field 1102 in FIG. 1, or the SYNC field 1202 in FIG. 12) is used by a receiving device for packet detection and automatic gain control setting, according to an embodiment. Further, in some embodiments, the SYNC field is used for carrier frequency offset estimating between a transmitting and a receiving device. To this end, in an embodiment, a receiving device performs autocorrelation of the SYNC field to generate a phase shift estimate of the phase shift between adjacent symbols (inter-symbol phase shift) of the SYNC field. FIG. 13 is a diagram of a SYNC field 1300 used to estimate inter-symbol phase shift between adjacent SYNC field symbols, according to an embodiment. Similar to the inter-period phase shift in an STF field of an OFDM data unit, in an embodiment, the inter-symbol phase shift in the SYNC field of a single carrier data unit is used for carrier frequency offset estimation and correction by a receiving device. In the embodiment of FIG. 13, the SYNC field 1300 includes four symbols 1302, each spread by an 11-chip Barker code. A receiving device generates an estimate of the phase shift $\theta$ between corresponding bits in two adjacent symbols of the SYNC field 1300 as indicated by the arrow 1304. Similar to the OFDM embodiments described above, the receiving device is able to unambiguously estimate the phase shift between two periods of the SYNC field as long as the phase shift is in a directly correctable region between negative $\pi$ radians and positive $\pi$ radians ($-\pi$ to $\pi$), according to an embodiment.

In an example embodiment, with a ±20 ppm local oscillator tolerance (with respect to the center) frequency in a receiving and in a transmitting device, a maximum frequency offset between the receiving and the transmitting device is ±20 ppm with respect to the carrier frequency. Accordingly, in this embodiment, with an example carrier frequency of 500 MHz, the maximum phase shift due to CFO is given by 500 kHz×40 ppm=20 kHz. With 100× down-clocking, the interval between two corresponding chips in adjacent symbols of the SYNC field (with 11 chip Barker spreading code) is 100 µs. In this embodiment, the maximum phase shift between two corresponding chips in adjacent SYNC field symbols is given by $\theta=2\pi \times 100e^{-6} \times 20e^3 = 4\pi$. Because the maximum phase shift between adjacent SYNC field symbols is not within the directly correctable region of $-\pi$ to $\pi$, in this embodiment, the CFO phase shift cannot be corrected directly because, in this case, there exists an ambiguity with respect to the actual phase shift for certain estimated values of $\theta$ (i.e., phase ambiguity between the values of $\theta$, $\theta \pm 2\pi$, or $\theta \pm 4\pi$).

As another example, with a carrier frequency of 430 MHz, the maximum phase offset between the AP 14 and the client station 25-1 due to CFO is given by ±430 kHz×40=17.2 kHz. With an example 50× down-clocking ratio used for generating low bandwidth data units, according to an embodiment, the interval between two chips in adjacent symbols in a SYNC field spread by an 11 chip Barker spreading code, is 50 µs. In this embodiment, the maximum phase shift between two SYNC field symbols is given by $\theta=2\pi \times 50e^{-6} \times 17.2e^3 = 1.72\pi$. Because the maximum phase shift between adjacent SYNC field symbols is not within the directly correctable region of $-\pi$ to $\pi$, in this embodiment, the phase shift $\theta$ cannot be determined directly because, in this case, there exists an ambiguity with respect to the actual phase shift for certain estimated values of $\theta$ (i.e., actual phase shift is either $\theta$ or $\theta \pm 2\pi$) between two adjacent symbols of the SYNC field.

Figure 14:
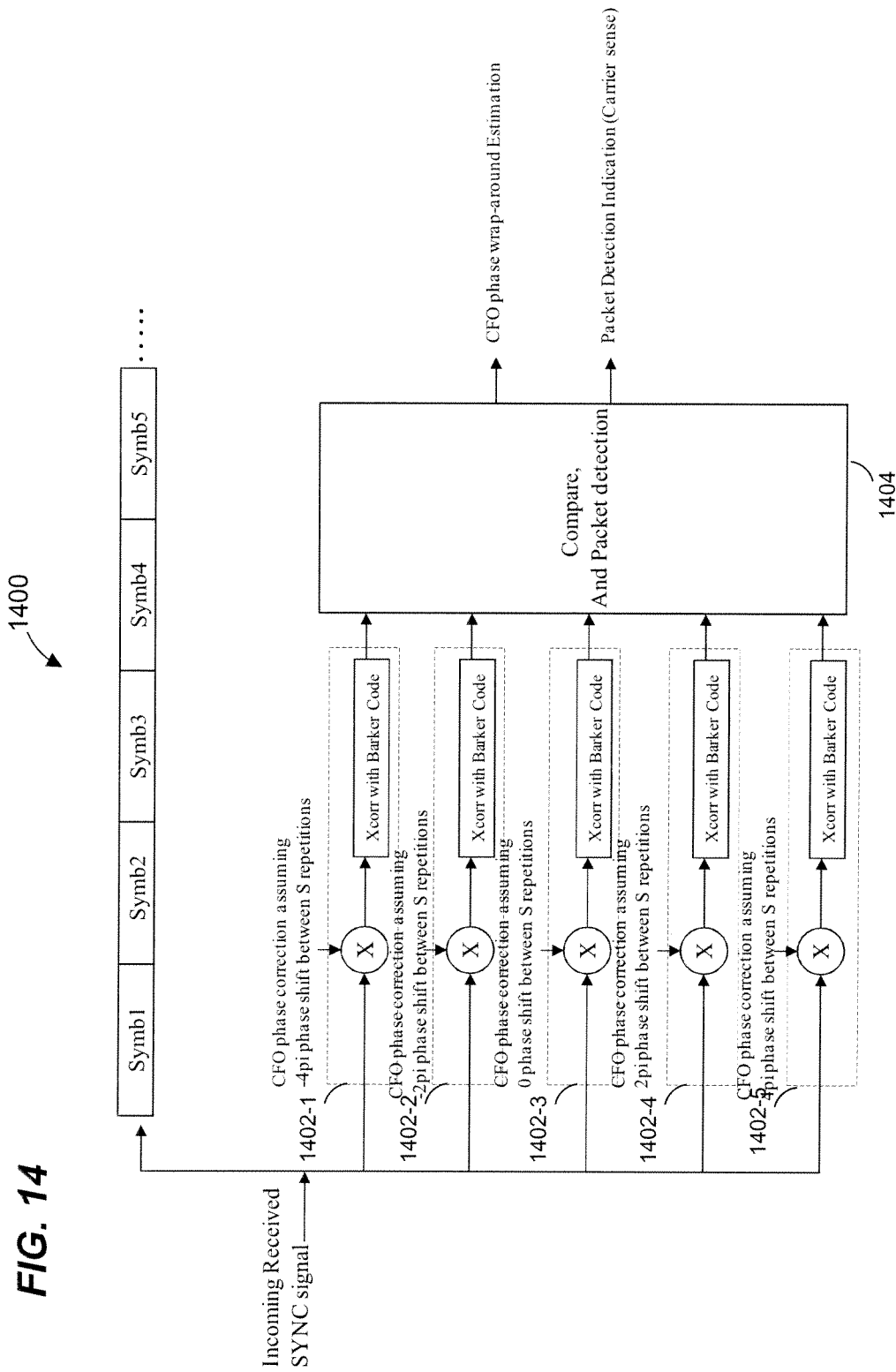
FIG. 14 is a diagram of a phase estimation unit capable of resolving phase shift ambiguity, according to another embodiment.

FIG. 14 is a diagram of a phase estimation unit 1400 capable or resolving phase shift ambiguity, according to an embodiment. The phase estimation unit 1400 is included in the PHY processing unit 20 of FIG. 1, according to one embodiment. The phase estimation unit 1400 is included in the PHY processing unit 29 of FIG. 1, according to another embodiment. In an embodiment, the phase estimation unit 1400 resolve phase shift ambiguity by determining the "phase wrap" value between adjacent SYNC field symbols. To this end, the phase estimation unit 1400 correlates the received SYNC signal with the received SYNC field shifted by each of several possible phase wrap values (e.g., 0, ±2$\pi$, ±4$\pi$, ±6$\pi$, etc.), and determines the actual phase wrap value based on a comparison between the cross correlation results. In the embodiment of FIG. 14, the phase estimation unit 1400 includes five cross-correlation modules 1402. In operation, each cross correlation module 1402 correlates received SYNC field symbols sequence shifted by a respective possible phase wrap value with the spreading code that was used to generate the SYNC field at a transmitting device. In particular, a cross-correlation module 1402-1 correlates the spreading code with received SYNC field symbols shifted by $-4\pi$, a cross-correlation module 1402-2 correlates the spreading code with received SYNC field symbols shifted by $-2\pi$, a cross-correlation module 1402-3 correlates the spreading code with received SYNC field symbols without introducing a phase shift, a cross-correlation module 1402-4 correlates the spreading code with received SYNC field symbols shifted by $2\pi$, and a cross-correlation module 1402-5 correlates the spreading code with received SYNC field symbols shifted by $4\pi$, in the illustrated embodiment. Equivalently, each possible phase wrap value is introduced into the spreading code and the phase shifted spreading code is correlated with the received SYNC field symbols, according to another embodiment. A comparison/packet detection unit 404 receives the five cross correlation results, performs packet detection based on the cross correlation result that indicates the highest correlation, and selects the phase wrap value corresponding to the cross-correlation result that indicates the highest correlation. In an embodiment, a CFO estimation unit (not shown) then utilizes cross-correlation of the SYNC field using the selected phase wrap value to estimate the "residue" (or directly correctable) inter-symbol phase shift (the residue phase shift between −π to π) and generates a CFO estimate based on the actual inter-symbol phase shift.

In the embodiment of FIG. 1400, the phase estimation unit 1400 includes five cross-correlation modules 1404 allowing the phase estimation unit 1400 to resolve phase shift ambiguity between five possible phase wrap values. In other embodiments, the phase estimation unit 1400 includes additional cross-correlation units that enable the phase estimation unit 1400 to distinguish between additional possible phase wrap values. For example, in one embodiment, the phase estimation unit 1400 includes seven cross-correlation modules 1404 allowing the phase estimation unit 1400 to resolve phase shift ambiguity between seven possible phase shift wrap values (e.g., 0, ±2π, ±4π, ±6π). Alternatively, in another embodiment, the phase estimation unit 1400 includes fewer cross-correlation modules 1402, for example, when using local oscillators with tighter tolerance, resulting in fewer possibilities for phase wrap values. In general, in various embodiments, the phase estimation unit 1400 includes any suitable number of cross-correlation units 1402 (e.g., 2, 3, 4, 5, 6, etc.).

In some embodiments, a large down-clocking factor used for low bandwidth data units results in the residue (or directly correctable) inter-symbol phase shift (between −π to π) that is outside of a decision region of differential binary phase shift keying (DBPSK) detector used for demodulating a low bandwidth data unit. In such cases, if the SYNC field of the data unit is generated with random or unknown values (e.g., scrambled ones as of the data unit 1100 of FIG. 11, or scrambled zeros of the data unit 1200 of FIG. 12), the receiving device is unable to accurately correct for the residue phase shift, leading to possible detection errors. In some such embodiments, in order to allow a receiving device to estimate and correct for the residue CFO, the SYNC field of a low bandwidth data unit is generated with bits of a known value (or values). For example, in one such embodiment, each symbol of the SYNC field is generated with all one, all minus ones, having alternating π and π/2 known phase shifts in each symbol, or using bits of any other suitable known values and/or having any other suitable known phase shifts. As a result, in such embodiments, a receiving device is able to correct residue phase shift caused by CFO by using the known values as a reference.

Figure 15:
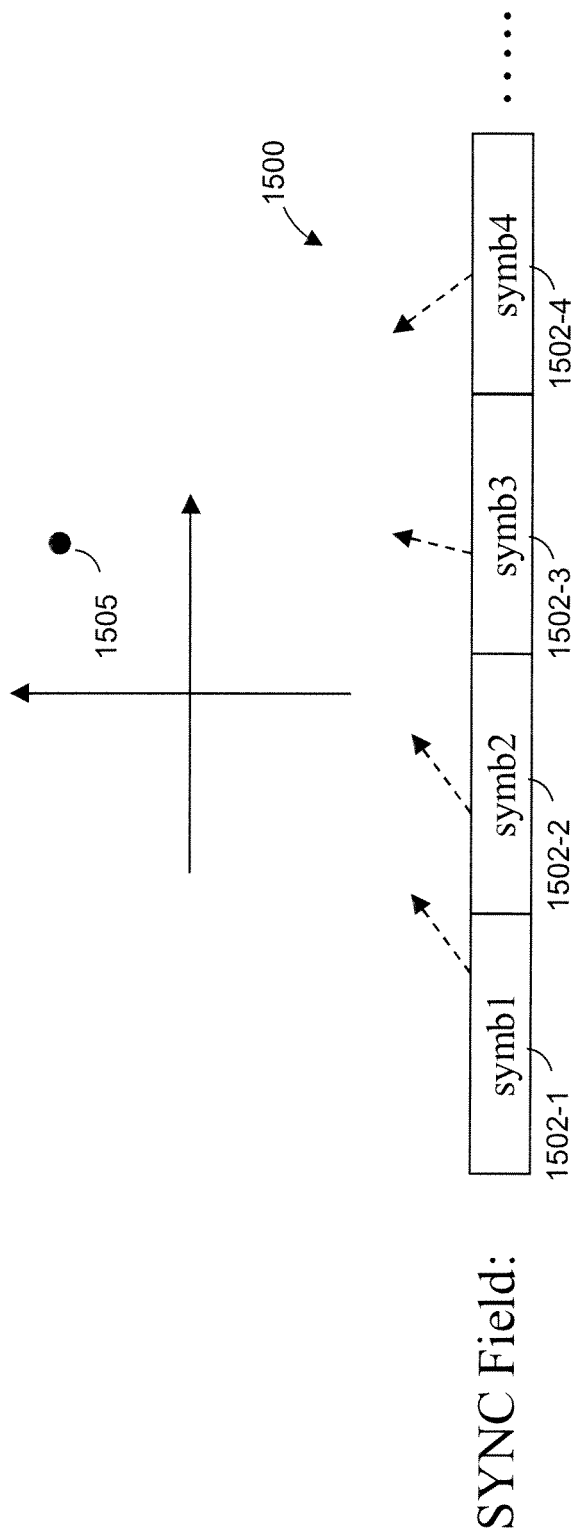
FIG. 15 illustrates a synchronization field having symbols of known values, according to an embodiment.

FIG. 15 illustrates a SYNC field 1500 having bits of a known value, according to one such embodiment. In the illustrated embodiment, each symbol 1502 is modulated to the same point, indicated in FIG. 15 by the constellation point 1505. In such embodiments, a receiving device is able to compensate for (or correct) residue CFO even when CFO leads to inter-symbol phase shift that is larger than the decision region of a DBPSK demodulator (e.g., larger than π/2), using the known constellation point (or points) as a reference. Another advantage of using SYNC field symbols of know values is that, in such embodiments, a receiving device is able to perform auto-correlation using the SYNC field for packet detection.

Figure 16:
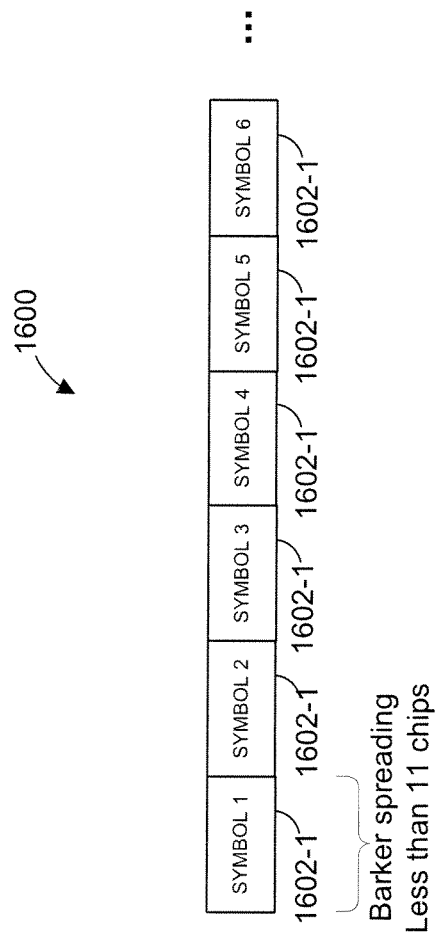
FIG. 16 illustrates a synchronization field in which each symbol is spread by a spreading code, according an embodiments.

In some embodiments, the SYNC field of a low bandwidth data nit (e.g., the SYNC field 1102 in FIG. 11 or the SYNC field 1202 in FIG. 2) is generated using a spreading code with less than 11 chips. FIG. 16 illustrates a SYNC field 1600 in which each symbol 1602 is spread by a Barker code having less than 11 chips, according to some such embodiments. In an embodiment, the reduced symbol interval results in a reduction in the number of possible values of the phase wrap in the shift between two symbols caused by CFO. Accordingly, a receiving device in such embodiments, needs to use fewer cross-correlators to resolve inter-symbol phase shift wrap ambiguities. In some embodiments, the reduced symbol interval eliminates any phase shift ambiguities and the actual phase shift due to CFO can be estimated directly. As an example, in an embodiment utilizing a carrier frequency of 500 MHz and a down-clocking ratio of 100× for low bandwidth data units, the interval between symbols of the SYNC field is reduced to less than 25 µs (e.g., with 1 or 2 chips per symbol), and, as a result, there will be no phase wrap ambiguity at the receiving device according to this embodiment. As another example, in an embodiment utilizing a carrier frequency of 430 MHz and a down-clocking ratio of 50 for low bandwidth data units, the interval between symbols of the SYNC field is reduced to less than 29 µs (e.g., with 1, 2, 3, or 4 chips per symbol), and, as a result, there will be no phase wrap ambiguity at the receiving device according to this embodiment.

In some embodiments, to compensate for the lower spreading gain resulting from a spreading code with fewer spreading chips per symbol (e.g., fewer than 11 chips) compared to the spreading gain achieved in embodiments that utilize a greater number of chips (e.g., 11 chips), a receiving device averages phase shift estimates obtained over a suitable number of symbols to achieve a desired performance (e.g., to achieve performance similar to that achieved using an 11 chip per symbol spreading code). To allow the receiving device to achieve the desired performance, in some embodiments, low bandwidth data units are generated with a SYNC field duration longer compared to the SYNC field duration used for normal mode data units.

In some embodiments, with no spreading of the SYNC field (e.g., when the spreading code is reduced to one chip), a receiving device estimates phase shift on chip by chip basis (rather than symbol by symbol basis). In such embodiments, when a typical WLAN channel having spread delay of 1 µs or less is utilized, if the chip to chip interval is 9.09 µs (e.g., for the down-clocking ratio of 100) or 4.54 µs (e.g., for the down-clocking ration of 50), the inter-chip multipath interference caused by the channel is relatively low and does not have a significant impact on phase estimation accuracy and, accordingly, CFO correction in such embodiments.

Depending on the embodiment, when an altered SYNC field (e.g., longer symbol duration, less spreading, etc.) is used in low bandwidth data units, the remaining fields of the data unit remain unchanged from the normal mode data unit format (or from a data unit format defined by a long range communication protocol, e.g., the IEEE-802.11b Standard), or one of more of the remaining fields is/are also altered compared to the normal mode (or the long range) data unit format. According to an embodiment in which a SYNC field with a shorter symbol duration is used for low bandwidths data units compared to a down-clocked version of IEEE 802.11b Standard data unit, the SYNC field with the shorter symbol duration is followed by a second SYNC field having the symbol duration corresponding to a down-clocked symbol duration of IEEE-802.11b Standard data units. Alternatively, in another embodiment in which a SYNC field with a shorter symbol duration is used for low bandwidths data units, the SYNC field with the shorter symbols duration follows a SYNC field having the symbol duration corresponding to a down-clocked symbol duration of IEEE-802.11b Standard data units. In an embodiment, the remaining fields of the data unit correspond to down-clocked versions of the corresponding fields of IEEE-802.11b Standard data units. In another embodiment, the SFD field of a low bandwidth data unit (e.g., the SFD field 1104 in FIG. 11 or the SFD field 1204 in FIG. 12) is also generated with the reduced symbol duration. Alternatively, in another embodiment, all fields of a low bandwidth data unit are generated using the reduced symbol duration. In this embodiment, the reduced symbol duration effectively increases the data rate of the low bandwidth data units compared to data rate corresponding to data units generated using the regular down-clocked symbol duration.

Figure 17:
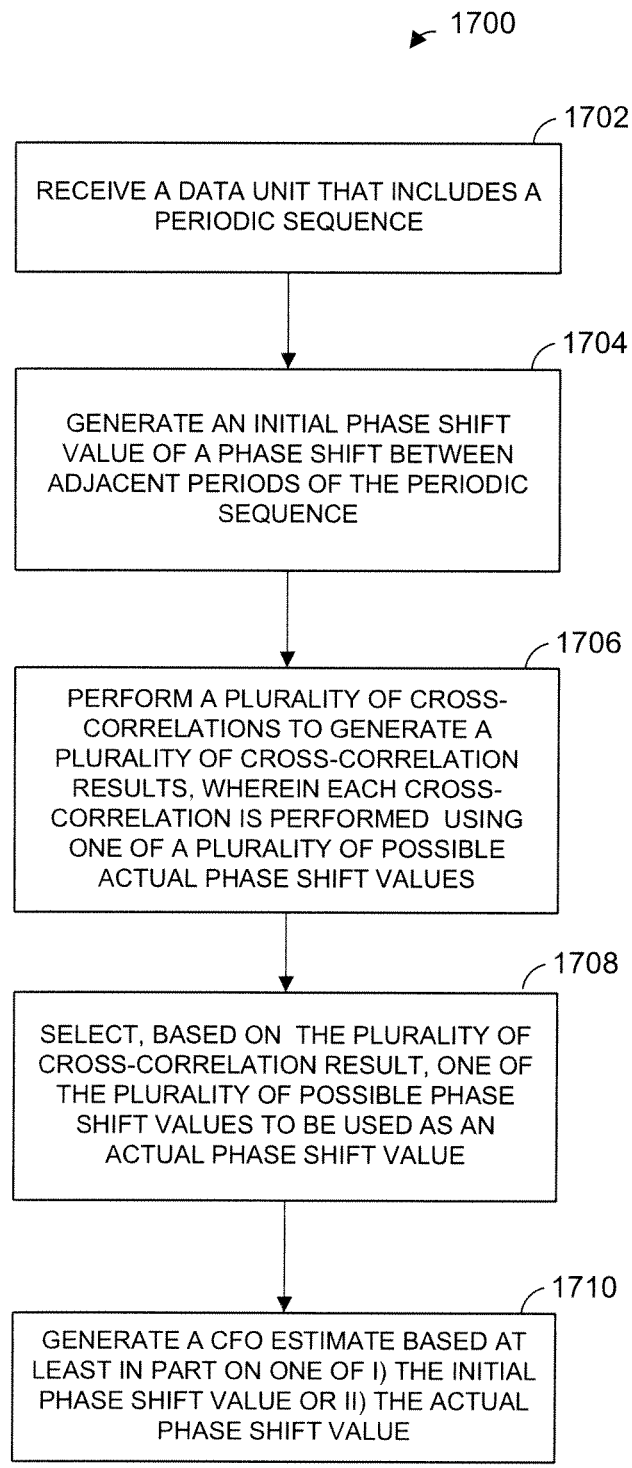
FIG. 17 is a flow diagram of an example method for estimating carrier frequency offset (CFO) between a transmitting device and a receiving device, according to an embodiment.

FIG. 17 is a flow diagram of an example method 1700 for estimating CFO, according to an embodiment. With reference to FIG. 1, the method 1700 is implemented by the network interface 16, in an embodiment. For example, in one such embodiment, the PHY processing unit 20 is configured to implement the method 1700. With continued reference to FIG. 1, in another embodiment, the method 1700 is implemented by the network interface 27 (e.g., the PHY processing unit 29 and/or the MAC processing unit 28). In one embodiment, the method 1700 is implemented the at least in part by the CFO estimation unit 900 of FIG. 9. In other embodiments, the method 1700 is implemented by other suitable network interfaces and/or other suitable communication devices.

At block 1702, a data unit is received at a receiving device via a communication channel from a transmitting device. In an embodiment, the data unit 500 of FIG. 5 is received. In another embodiment, another suitable data unit is received. The data unit is a low bandwidth data unit transmitted in a narrow bad communication channel, according to an embodiment. In an embodiment, the communication channel is one of the channels 202, 204, 206, 208, 210 or 212 of FIG. 2. In another embodiment, the communication channel is another suitable communication channel. The data unit received at block 1702 includes a short training field generated using a periodic sequence that enable the receiving device to estimate and compensate for carrier frequency offset between the receiving device and the transmitting device, according to an embodiment.

At block 1704, an initial phase shift θ is between adjacent periods of the periodic sequence is estimated. In some embodiments, the initial phase shift θ does not necessarily correspond to the actual phase shift between adjacent periods of the periodic sequence due to a phase shift ambiguity. In particular, the phase shift cannot be unambiguously determined when the initial phase shift θ is outside of a directly correctable region of $-\pi$ to $\pi$, according to an embodiment.

At block 1706, a plurality of cross-correlations are performed and a plurality of cross-correlation results are thereby generated. Each cross-correlation is performed using of several possible actual phase shifts, according to an embodiment. At block 1708, one of the several possible phase actual phase shift values is selected based on the plurality of cross-correlation results generated at block 1706. In an embodiment, the actual phase shift value corresponding to the cross-correlation result that indicates the highest correlation is selected.

At block 1710, the initial phase shift estimate θ generated at block 1702 (if the initial phase shift value θ is within the directly correctable region) or the actual phase shift estimate (if the initial phase shift value θ is outside of the directly correctable region) is used to generate a carrier frequency offset estimate.

Figure 18:
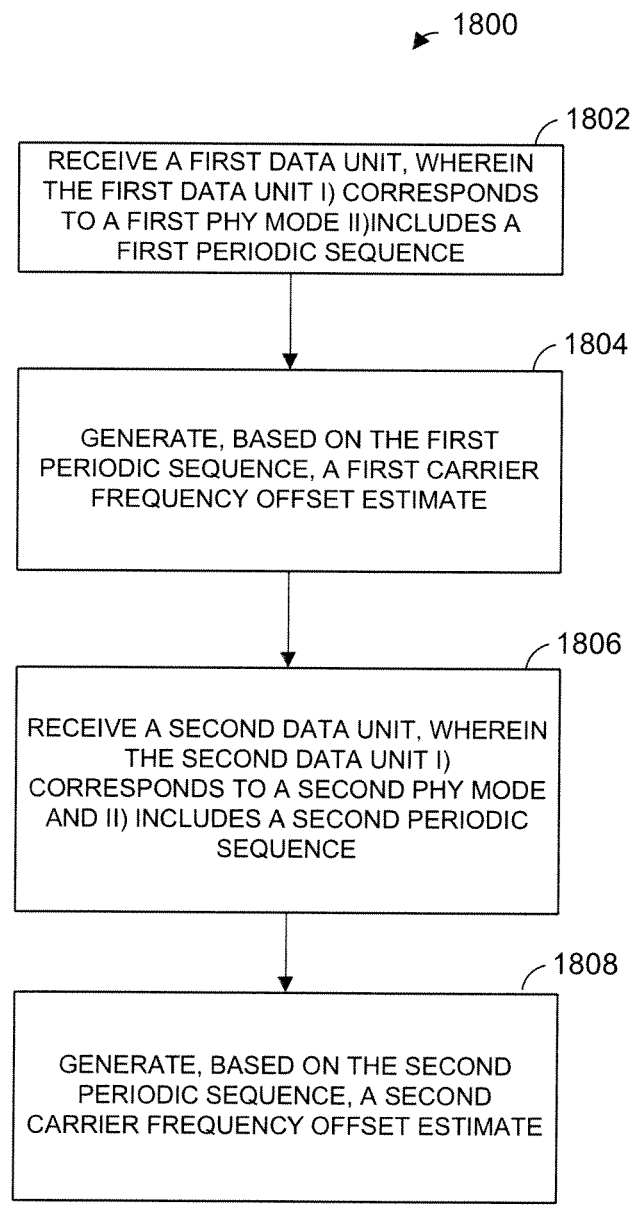
FIG. 18 is a flow diagram of an example method for estimating CFO between a transmitting device and a receiving device, according to another embodiment.

FIG. 18 is a flow diagram of another example method 1000 for estimating CFO, according to an embodiment. With reference to FIG. 1, the method 1800 is implemented by the network interface 16, in an embodiment. For example, in one such embodiment, the PHY processing unit 20 is configured to implement the method 1800. With continued reference to FIG. 1, in another embodiment, the method 1800 is implemented by the network interface 27 (e.g., the PHY processing unit 29 and/or the MAC processing unit 28). In other embodiments, the method 1800 is implemented by other suitable network interfaces and/or other suitable communication devices.

At block 1802, a first data unit is received. The first data unit corresponds to a first PHY mode. For example, the first data unit corresponds to the normal mode, in an embodiment. In an embodiment, the data unit 400 of FIG. 4 is received. In another embodiment, a different first data unit is received. The first data unit includes a first periodic sequence. The first periodic sequence is included in a short training field of the data unit, such as the STF field 800 illustrated in FIG. 8. In another embodiment, the first periodic sequence corresponds to a different STF field.

At block 1804, a first carrier frequency offset estimate is generated based on the periodic sequence included in the first data unit received at block 1802. The first periodic sequence allows for direct CFO estimation in the first PHY mode, according to an embodiment. In an embodiment, the first CFO estimate is based at least in part on autocorrelation of the periodic sequence.

At block 1806, a second data unit is received. The second data unit corresponds to a second PHY mode. For example, the second data unit corresponds to a low bandwidth mode, according to an embodiment. In an embodiment, the data unit 500 of FIG. 5 is received. In another embodiment, a different second data unit is received. The second data unit includes a second periodic sequence. In an embodiment, the second periodic sequence is included in a short training field of the second data unit, such as the STF field 1000 illustrated in FIG. 10. The second periodic sequence included in the second data unit is different than the first periodic sequence included in the first data unit, according to an embodiment. For example, in an embodiment, the second periodic sequence is periodic with a period that is shorter compared of the period of the first periodic sequence.

At block 1804, a second carrier frequency offset based on the second periodic sequence is estimated. The second periodic sequence allows for direct CFO estimation in the second PHY mode. In an embodiment, the second CFO estimate is based at least in part on autocorrelation of the periodic sequence.

At least some of the various blocks, operations, and techniques described above may be implemented utilizing hardware, a processor executing firmware instructions, a processor executing software instructions, or any combination thereof. Also, some of the various blocks, operations, and techniques may be performed in a different order (and/or concurrently) and still achieve desirable results. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for estimating a carrier frequency offset (CFO) between a transmitting device and a receiving device, the method comprising:
    receiving, at the receiving device, a data unit from the transmitting device, wherein the data unit includes a periodic sequence;
    generating, at the receiving device, an initial phase shift value of a phase shift between adjacent periods of the periodic sequence;
    performing, at the receiving device, a plurality of cross-correlations using at least one period of the periodic sequence to generate a plurality of cross-correlation results, wherein each cross-correlation is performed using one of a plurality of possible actual phase shift values; and
    selecting, at the receiving device and based on the plurality of cross-correlation results, an actual phase shift value from the plurality of possible actual phase shift values; and
    generating, at the receiving device, an estimate of the CFO based at least in part on one of i) the initial phase shift value or ii) the actual phase shift value.

2. The method of claim 1, wherein generating the initial phase shift value comprises performing auto-correlation of one or more periods of the periodic sequence to produce one or more initial phase estimates.

3. The method of claim 1, wherein generating the initial phase shift value comprises performing auto-correlation of a plurality of periods of the periodic sequence to generate a plurality of initial phase shift values, the method further comprising averaging the plurality of initial phase shift values to generate the initial phase shift value.

4. The method of claim 1, wherein the plurality of cross-correlations are performed in response to determining that the initial phase shift value does not correspond to a phase shift value in a directly correctable region.

5. The method of claim 4, wherein the directly correctable region is between negative π radians and positive π radians.

6. The method of claim 1, wherein performing the plurality of cross-correlations comprises:
    shifting at least one period of the periodic sequence by a first possible actual phase shift value of the plurality of possible actual phase shift values to generate a first shifted periodic sequence; and
    performing cross-correlation of at least of period of the periodic sequence with the first shifted periodic sequence.

7. The method of claim 6, further comprising:
    shifting at least one period of the periodic sequence by a second possible phase shift value of the plurality of possible phase shift values to generate a second shifted periodic sequence, and
    performing cross-correlation of the at least of period of the periodic sequence with the second shifted periodic sequence.

8. The method of claim 7, wherein selecting the actual phase shift value is based on a comparison of the first cross-correlation result with the second cross-correlation result.

9. The method of claim 1, wherein the data unit is transmitted via orthogonal frequency division multiplexing (OFDM) modulation, and wherein the periodic sequence is included in a short training field (STF) of the data unit.

10. An apparatus for estimating a carrier frequency offset (CFO) between a transmitting device and a receiving device, the apparatus comprising:
    a network interface configured to receive a data unit transmitted by the transmitting device, wherein the data unit includes a periodic sequence; and wherein the network interface includes:
        a phase estimation unit configured to
            generate an initial phase shift value of a phase shift between adjacent periods of the periodic sequence,
            perform a plurality of cross-correlations using at least one period of the periodic sequence to generate a plurality of cross-correlation results, wherein each cross-correlation is performed using one of a plurality of possible actual phase shift values, and
            select, based the plurality of cross-correlation results, an actual phase shift value from the plurality of possible actual phase shift values; and
        a CFO estimation unit configured to generate an estimate of the CFO based at least in part on one of i) the initial phase shift value or ii) the actual phase shift value.

11. The apparatus of claim 10, wherein the phase estimation unit is configured to generate the initial phase shift value at least by performing autocorrelation of one or more periods of the periodic sequence to produce one or more initial phase estimates.

12. The apparatus of claim 10, wherein the phase estimation unit is configured to generate the initial phase shift value at least by performing autocorrelation of a plurality of periods of the periodic sequence to generate a plurality of initial phase shift values and averaging the plurality of initial phase shift values to generate the initial phase shift value.

13. The apparatus of claim 10, wherein phase estimation unit is configured to perform the plurality of cross-correlations in response to determining that the initial phase shift value does not correspond to a phase value in a directly correctable region.

14. The apparatus of claim 13, wherein the directly correctable region is between negative π radians and positive π radians.

15. The apparatus of claim 10, wherein the phase estimation unit configured to:
    shift at least one period of the periodic sequence by a first possible actual phase shift value of the plurality of possible actual phase shift values to generate a first shifted periodic sequence; and
    perform cross-correlation of at least one period of the periodic sequence with the first shifted periodic sequence.

16. The apparatus of claim 15, wherein the cross-correlation unit is further configured to:

shift at least one period of the periodic sequence by a second possible actual phase shift value of the plurality of possible actual phase shift values to generate a second shifted periodic sequence; and perform cross-correlation of the at least one period of the periodic sequence with the second shifted periodic sequence.

17. The apparatus of claim 16, wherein the phase estimation unit is configured to select the actual phase shift value based on a comparison of the first cross-correlation result with the second cross-correlation result.

18. The apparatus of claim 10, wherein the data unit is an orthogonal frequency division multiplexing (OFDM) data unit, and wherein the periodic sequence is included in a short training field of the OFDM data unit.

* * * * *